(12) United States Patent
Tang et al.

(10) Patent No.: US 6,277,176 B1
(45) Date of Patent: *Aug. 21, 2001

(54) MOVING FILTER DEVICE HAVING FILTER ELEMENTS WITH FLOW PASSAGES AND METHOD OF FILTERING AIR

(75) Inventors: Yuan-Ming Tang, New Brighton; Ricardo Lira; Michael Harms, both of Woodbury, all of MN (US)

(73) Assignee: 3M Innovative Properties Company, St. Paul, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/126,181

(22) Filed: Jul. 30, 1998

(51) Int. Cl.[7] ............ B01D 33/00; B01D 45/14
(52) U.S. Cl. ............ 95/270; 95/277; 95/285; 55/400; 55/467; 55/471; 55/473; 55/498; 55/486; 55/524; 55/DIG. 39
(58) Field of Search ............ 55/309, 400, 401, 55/404, 467, 471, 473, 524, DIG. 39, 498, 486; 95/277, 285, 270

(56) References Cited

U.S. PATENT DOCUMENTS

| | | | |
|---|---|---|---|
| Re. 30,782 | 10/1981 | van Turnhout | 264/22 |
| 2,272,746 | 2/1942 | Holm-Hansen | 183/4 |

(List continued on next page.)

FOREIGN PATENT DOCUMENTS

| | | | |
|---|---|---|---|
| 2219846 * | 10/1973 | (DE) | 55/473 |
| 0 196 337 A1 | 3/1985 | (EP) . | |
| 0 306 278 A1 | 3/1989 | (EP) . | |
| 0 810 023 A1 | 12/1997 | (EP) . | |
| 1037365 * | 7/1966 | (GB) | 55/467 |
| 2223187 * | 4/1990 | (GB) | 55/400 |
| 11-90146 | 9/1997 | (JP) . | |
| WO 91-11246 | 8/1991 | (WO) . | |
| WO 97/44624 | 11/1997 | (WO) . | |

OTHER PUBLICATIONS

American National Standard Method for Measuring Performance of Portable Household Electric Cord–Connected Room Air Cleaners, ANSI/AHAM AC–1–1988, Association of Home Appliance Manufacturers, 24 pages.

Primary Examiner—David A. Simmons
Assistant Examiner—Robert A. Hopkins
(74) Attorney, Agent, or Firm—Gary L. Griswold; Robert W. Sprague; William J. Bond

(57) ABSTRACT

There is provided an air delivery device and method of moving and filtering air. The air delivery device comprises a housing having an air inlet and an air outlet. Between the air inlet and the air outlet is located an air delivery fan having at least two rotating air moving elements, the rotating air moving elements intersects the flow of air between the air inlet and the air outlet and establishes a higher pressure zone at the air outlet relative to the air inlet. The air delivery fan further comprises at lest one filter element, having at least one upstream filter face and at least one downstream filter face, defining at least one primary flow channel, and rotating along the same axis of rotation as the air moving elements and preferably forming the air moving elements at least in part. The upstream filter face moves into a portion of the airflow through the air delivery fan such that the upstream filter face impacts a portion of the moving airflow in a flow channel, permitting the air to flow through the filter element into the airflow of an further flow channel. The filter elements further define air flow passages or inlets allowing substantially unimpeded airflow to the primary flow channels and out to the air outlet. The air filter elements comprise an electret charged filter media.

62 Claims, 8 Drawing Sheets

U.S. PATENT DOCUMENTS

| | | | |
|---|---|---|---|
| 3,123,286 | 3/1964 | Abbott | 230/134 |
| 3,126,263 | 3/1964 | Schwab | 55/317 |
| 3,392,512 | 7/1968 | Ziolko et al. | 55/400 |
| 3,402,881 | 9/1968 | Moore et al. | 230/232 |
| 3,590,629 | 7/1971 | Courbon | 73/28 |
| 3,676,985 | 7/1972 | Foreman et al. | 55/317 |
| 3,765,155 | 10/1973 | Courbon | 55/270 |
| 3,877,905 | 4/1975 | Novak | 55/404 |
| 3,877,906 | 4/1975 | Peterson | 55/404 |
| 3,898,066 | 8/1975 | Miskiewicz | 55/317 |
| 3,931,016 | 1/1976 | Lovelady | 210/297 |
| 3,993,564 | 11/1976 | Novak | 210/360 |
| 4,038,058 | 7/1977 | Miskiewicz | 55/317 |
| 4,071,336 | 1/1978 | Yamine | 55/203 |
| 4,266,829 | 5/1981 | Divers | 299/64 |
| 4,292,055 | 9/1981 | De Castella et al. | 55/233 |
| 4,308,041 | 12/1981 | Ellis et al. | 55/510 |
| 4,411,675 | 10/1983 | de Castella | 55/316 |
| 4,422,824 | 12/1983 | Eisenhardt, Jr. | 416/5 |
| 4,450,756 | 5/1984 | Kling | 98/115 |
| 4,469,084 | 9/1984 | Gillotti | 126/96 |
| 4,534,230 | 8/1985 | Courbon | 78/863.23 |
| 4,547,208 | 10/1985 | Oace | 55/400 |
| 4,658,707 | 4/1987 | Hawkins et al. | 98/2.11 |
| 4,676,721 | 6/1987 | Hardee | 416/146 |
| 4,753,573 | 6/1988 | McKnight | 416/62 |
| 4,840,650 | 6/1989 | Matherne | 55/385.1 |
| 4,889,543 | 12/1989 | Burt | 55/97 |
| 4,917,942 | 4/1990 | Winters | 428/286 |
| 5,057,128 | 10/1991 | Panzica et al. | 55/181 |
| 5,230,800 | 7/1993 | Nelson | 210/496 |
| 5,238,473 | 8/1993 | Femiani | 55/290 |
| 5,256,476 | 10/1993 | Tanaka | 428/241 |
| 5,265,348 | 11/1993 | Fleishman et al. | 34/97 |
| 5,292,479 | 3/1994 | Haraga et al. | 422/5 |
| 5,332,426 | 7/1994 | Tang et al. | 96/153 |
| 5,341,565 | 8/1994 | Kuryliw | 29/889.721 |
| 5,370,721 | 12/1994 | Carnahan | 55/279 |
| 5,514,197 | 5/1996 | Den | 55/405 |
| 5,560,835 | 10/1996 | Williams | 210/783 |
| 5,573,563 | 11/1996 | Odom | 55/301 |
| 5,681,364 | 10/1997 | Fortune | 55/400 |
| 5,683,478 | 11/1997 | Anonychuk | 55/385.3 |
| 5,749,702 | 5/1998 | Datta et al. | 415/119 |
| 5,868,616 | 2/1999 | Ohsaki et al. | |
| 5,879,230 * | 3/1999 | Wardlaw et al. | 55/467 |

\* cited by examiner

MOVING FILTER DEVICE HAVING FILTER ELEMENTS WITH FLOW PASSAGES AND METHOD OF FILTERING AIR

BACKGROUND AND FIELD OF INVENTION

The present invention relates to moving filter devices, particularly moving filters designed to be used in air delivery fans.

Particulate air filters are conventionally formed of porous media. The particle laden air is passed through the porous media which removes the particulate based on physical entrapment, impaction, surface attraction, inertial forces or the like. The porous filter media can be porous films, open celled foams, woven fabrics, molded particles, or nonwoven fabrics or webs and the like. The filter media can be flat or formed into a three dimensional configuration (generally a pleated form). Pass through type filters will act on the entire airstream passed through the filter media with an associated pressure drop and filtration efficiency that is characteristic of the media, its level of particulate loading and the airstream velocity and pressure. Generally, as the filter media becomes loaded with particulates the pressure drop increases, however, the filtration efficiency can increase or decrease depending on the nature of the media and the particulates being removed.

Generally, most filters when used are static with the particle laden air driven through the filter. However, filters that move have been proposed, for example, to keep fresh filter media in the path of the airstream to be filtered as disclosed in U.S. Pat. No. 5,560,835 (driven slowly by drive rotor) or U.S. Pat. Nos. 4,038,058 and 3,898,066 (filter media driven by air impinging on rotor blades). These filters operate like conventional flow-through static filters and have the associated problem of pressure drop buildup over time. Flow through type filters have also been associated with faster moving devices such as rotating disk drives (U.S. Pat. No. 4,308,041), on an air inlet to a combine vent fan (U.S. Pat. No. 3,392,512), between fan blades on an air inlet fan for a turbine engine (U.S. Pat. No. 3,402,881), on a fume exhaust fan (U.S. Pat. No. 4,450,756), or in an air inlet to a building ventilation fan (U.S. Pat. No. 3,126,263). The proposed filters placed on a fan designed to circulate air (e.g., U.S. Pat. Nos. 3,402,881 and 4,450,756) have the filter media strategically placed to ensure that all the air passing through the system is passed through the filter media. In U.S. Pat. No. 3,402,881, the filter media 100 is woven between fan vanes 98 and sealed to prevent air from bypassing the filter media. This requires that the filter media be periodically cleaned. This cleaning is done by a complicated periodic backflow of air from the engine compressor or like source of high pressure air in the system. With U.S. Pat. No. 4,450,756, the filter must be periodically removed and cleaned or replaced. If the filter is not replaced when loaded, the pressure drop across the filter rises often to unacceptable levels, cutting off airflow. Although not desirable generally in certain filter applications this reduction in airflow is unacceptable. In automotive cabin applications, increases in pressure, due to filter media particle loading, can drastically reduce airflow which can result in dangerous window fogging.

In automotive or furnace filter applications, the general approach has been to place a filter at some location in the airstream (e.g., in the ducts) to intersect the entire airstream. Commercially the almost universal approach has been to place filters at various locations between the air inlet and air outlet in a vehicle or home heating and air conditioning system. An issue with these filters is they are often difficult to access unless they are located near the air inlet or outlet(s). However if the filter is located at or near an air inlet (which generally are easy to access) only incoming air or recirculated air is filtered, but not both, unless multiple filters are used at the air inlet(s) for fresh air and the air inlet(s) for recirculated air. In a novel variant of this general approach, U.S. Pat. No. 5,683,478 proposes placing a static filter inside a fan of the blower motor assembly intersecting the airstream immediately prior to the fan, as both recirculated and fresh air directed through the fan are filtered.

Generally, filter materials that are used function at very low pressure drops to ensure that the system, even if the filter is fully loaded with particulates, does not unacceptably reduce airflow. However, if the filter media is of the very low pressure drop type it generally is a low efficiency filter (e.g., an open nonwoven web), has a limited lifetime (e.g. charged webs with relatively low basis weight) or is very bulky (e.g., a heavily pleated filter), which is undesirable where there is limited space such as in an automotive Heating, Ventilation or Air Conditioning (HVAC) system. Alternatively, it has been proposed that a certain portion of the airflow bypass the filter to ensure that pressure drop does not rise unacceptably during the lifetime of the filter. An air bypass of this type can eliminate the issue of unacceptably reduced airflow through the HVAC system due to a fully loaded filter but severely impacts filtration efficiency, particularly when filtering incoming air. Ideally, to ensure adequate airflow to an automotive cabin, the pressure drops of a filter in the HVAC system should show little or no pressure drop over its lifetime, no matter how long it is in use. Similarily, home heating system filters should not significantly reduce airflow even when fully particle laden.

SUMMARY OF THE INVENTION

The invention device relates to a novel air filter device for use in a heating ventilation or air conditioning system or the like where the filter device shows little or no pressure drop during use. The invention air filter device comprises a housing having an air delivery fan, preferably a fan having an axial air inlet and a radial air outlet. An axially rotating fan and filter unit is located between the air inlet and air outlet. The fan/filter units, if separate, have a common axis of rotation, which is generally parallel with the axial air inlet of the filter housing. The filter unit is comprised of at least one filter element with a front face and a back face. Adjacent filter element front and back faces are mutually spaced over at least a portion of their entire width and/or length such that air can pass unimpeded in an air channel formed between the adjacent front and back faces. Adjacent filter element front and back faces are preferably on different filter elements. Preferably, multiple filter elements are spaced in the radial direction around the axis of rotation and are parallel with the axis of rotation. The fan and filter units are also provided with air moving means, which can be air moving elements and/or air filter elements. The air moving elements are also preferably spaced in the radial direction around the axis of rotation and are parallel with the axis of rotation. The optional air moving means establish the airflow with a general airflow direction at a given pressure head and volumetric flowrate. With the preferred centrifugal type fan the air is drawn in axially with the fan and filter unit axis of rotation and discharged radially outward. The air moving elements and/or filter elements are spaced from adjacent air moving elements and/or filter elements to allow the unimpeded passage of air between the air moving elements and/or filter elements.

BRIEF DESCRIPTION OF THE DRAWINGS

The following drawings illustrate preferred, but not exclusive embodiments of the invention.

DETAILED DESCRIPTION OF THE INVENTION

Figure 1:
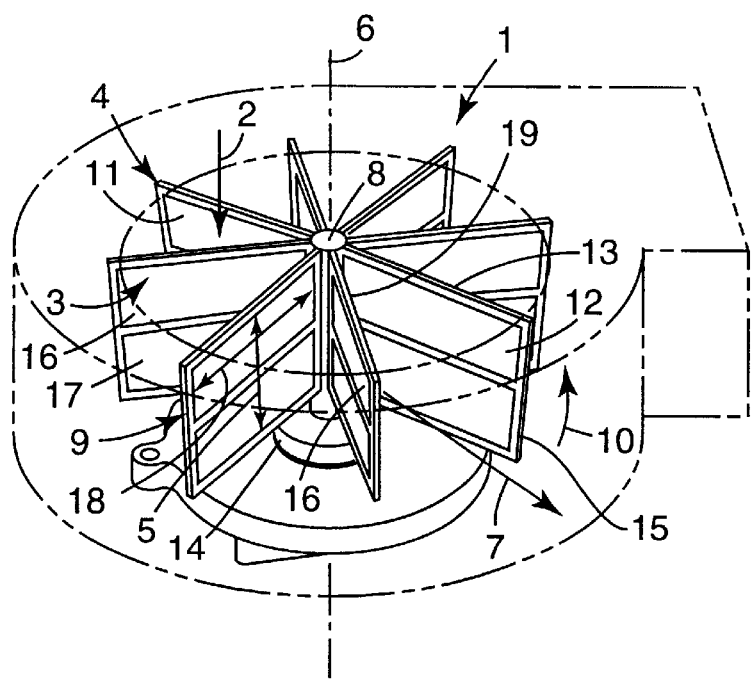
FIG. 1 is a perspective view of a filter according to a first embodiment of the invention.

The invention air delivery device comprises a housing having an air inlet and an air outlet. The housing generally is continuous between the inlet and outlet so as not to allow air to enter or leave the device other than at the inlet and outlet respectively. However, small bypass vents can be provided so long as the net flow of air to the outlet is not significantly reduced. Between the air inlet and the air outlet is located an air delivery fan having at least two rotating air moving means. Air delivery fan air moving elements are air impermeable and are generally fan blades that radiate outward from the central axis of rotation or are arranged around the central axis of rotation (e.g. in an annular array). The rotating air moving and/or filter elements intersect the flow of air between the air inlet and the air outlet and establishes a higher pressure zone at the air outlet and a lower pressure zone at the air inlet. The air moving or filter elements are positioned in the housing such that there is a relatively small area available for air to bypass the air moving and/or filter elements. Air which enters the lower pressure zone formed at the air inlet is drawn into and through the rotating air moving and/or filter elements and is forced toward the air outlet under pressure, generally about 5 mm water or greater, preferably about 10 mm water or greater than the inlet lower air pressure zone than the air inlet pressure.

The air delivery fan comprises at least one air filter element. The filter element(s) have an upstream filter face and a downstream filter face where at least the upstream filter face rotates along the same axis of rotation as any air moving elements. Like the rotating air moving elements, the filter elements are preferably situated on the air delivery fan such that substantially the entire airstream passing through the fan intersects one or more filter elements prior to being forced to the air outlet by the air moving elements or the filter elements. The filter elements do this by being situated in the housing such that the filter elements are generally coextensive with any air moving means or elements in a given lengthwise extent. This given lengthwise extent of the air moving means or elements is generally perpendicular to the direction of the airflow toward the air outlet or perpendicular to the direction of rotation of the air moving elements. The air filter elements will extend across the entire cross-sectional area of the housing which cross-sectional area is traversed by the air moving means and through which the airflow is passed toward the air outlet. However, if desired, a given substantial portion of the given lengthwise extent of an air moving element(s) can be provided without an air filter element permitting a portion of the airstream to go unfiltered by bypassing the provided filter element. If multiple air filter elements are provided at different radial locations of the fan, each filter element can have different portions provided without filter media along the same given lengthwise extent.

For each filter element, there is an upstream filter face and a downstream filter face. The upstream filter face generally faces the direction of rotation of the fan air moving elements or filter elements with the downstream filter face facing the direction opposite the direction of rotation of the air moving or filter elements. As such, the upstream filter face moves at an angle relative to the airflow in the air delivery fan such that the upstream filter face impacts the moving airflow, permitting a portion of the air to flow through the filter element from the upstream filter face to a downstream filter face and from the downstream filter face back into a new portion of the airflow. The upstream filter face acts like an airfoil with higher pressure air on this face forcing air into and through the filter element to the downstream filter face which is at a lower air pressure.

Between an adjacent upstream filter face and downstream filter face, along the filter element in the direction of the given lengthwise extent, there is a filter element leading edge and a primary trailing edge forming an upstream filter face. The filter element leading edge is generally displaced axially outward of the trailing edge and/or is forward of the trailing edge in the direction of rotation. It is possible that a secondary trailing edge be displaced axially outward of the leading edge, for example, where the filter element is in the form of a zigzag filter or the like, however, the leading edge will be forward of this secondary trailing edge in the direction of rotation. In any event, the filter element or elements do not extend continuously in the direction of rotation of the fan, and as such, air can flow past a given filter element in the air flow channels provided. The air flow channels are generally provided between the upstream face of a filter element and an adjacent downstream filter face, generally an adjacent filter element downstream face, and are spaced to allow airflow toward the air outlet with minimal pressure drop (generally by air flow passages such as holes, gaps or the like, formed in or between the upstream and downstream filter faces). Preferably, the adjacent upstream and downstream filter faces forming the air flow channels are between one filter element and an adjacent filter element. The air flow passages (e.g., gaps or holes) are provided to allow substantially unimpeded airflow out of a flow channel and generally corresponding air flow passages (e.g., holes or gaps) provide substantially unimpeded airflow into a flow channel between adjacent upstream and downstream filter faces. However, secondary flow channels can be formed between upstream and downstream faces of filter elements where there are only outlet air passages. Generally, these secondary air channels would be in fluid communication with primary air channels via a filter element filter, and would be formed by folding or like directional changes in the filter element creating a flow channel between the downstream filter face and an opposing portion of the same filter face acting as a secondary upstream filter face The filter element generally can extend at least 0.5 cm on average on the upstream face(s) from the leading edge to the trailing edge, preferably at least 1 cm, however, the extent of the filter element depends on the size of the air delivery device and its operation. This distance on the upstream face between the leading edge and the trailing edge generally defines the amount of available filter material or media available for filtration of a given portion of the airstream as this portion of the airstream flows past the upstream filter face of the filter element. Of course, that fraction of this airstream portion that passes through the upstream filter face is available for further filtration as part of a new portion of the airstream between the downstream filter face and any adjacent upstream filter face.

The filter element generally comprises filter media formed of a fibrous filter web comprised of electret charged filter fibers. The fibrous filter is generally a nonwoven fibrous web where at least a portion of the fibers forming the web are electret charged. However, it is possible for a filter web to have a variable permeability between the leading and trailing edges with portions either above or below the preferred ranges. If the filter or filter web does vary in permeability, preferably the most permeable material is on that portion of the filter media with the slowest speed of rotation (e.g., the portion closest to the axis of rotation).

The preferred filter is comprised of a nonwoven fibrous web of charged electret containing fibers which can be any suitable open nonwoven web of charged fibers. The filter web could be formed of the split fibrillated charged fibers as described in U.S. Pat. No. 30,782. These charged fibers can be formed into a nonwoven web by conventional means and optionally joined to a supporting scrim such as disclosed in U.S. Pat. No. 5,230,800 forming an outer support layer. The support scrim can be a spunbond web, a netting, a Claf web, or the like.

Alternatively, the nonwoven fibrous filter web can be a melt blown microfiber nonwoven web, such as disclosed in U.S. Pat. No. 4,917,942 which can be joined to a support layer during web formation as disclosed in that patent, or subsequently joined to a support web in any conventional manner. The melt blown nonwoven web can be charged after it is formed and before or after joined to a support layer if provided. Also, it has been proposed to charge the microfibers being collected as a web. The melt blown nonwoven webs are typically formed by the process taught in Wente, Van A., "Superfine Thermoplastic Fibers" in *Industrial Engineering Chemistry*, Vol. 48, pages 1342 et seq., (1956) or Report No. 4364 of the Naval Research Laboratories, published May 25, 1954, entitled "Manufacture of Superfine Organic Fibers" by Wente, Van A., Boone C. D. and Feluharty, E. L., which fibers are collected in an random fashion, such as on a perforated screen cylinder or directly onto a support web or in the manner described in PCT Appln. No. WO 95/05232 (between two corotating drum collectors rotating at different speeds creating a flat surface and a undulating surface). The collected material can then subsequently be consolidated, if needed and charged such as in the manner described in U.S. Pat. No. 4,215,682. Alternative charging methods for the filter web layer to form electrets include the methods described in U.S. Pat. Nos. 4,375,718 or 4,592,815 or PCT Appln. No. WO 95/05501.

The fibers of the nonwoven filter web can also be charged by known methods e.g., by use of corona discharge electrodes, high-intensity electric fields or by tribo-charging (e.g., as described in U.S. Pat. No. 4,798,850) where fibers of differing dielectric properties are rubbed together, e.g., during formation of the nonwoven web, creating mutual charges on the fibers.

The fibers forming the nonwoven fibrous filter web are generally formed of dielectric polymers capable of being charged to create electret properties. Generally, polyolefins, polycarbonates, polyamides, polyesters and the like are suitable, preferred are polypropylenes, poly(4-methylpentenes) or polycarbonates, which polymers are free of additives that tend to discharge electret properties.

Generally, the filter media web should have an average Frazier Permeability of about 2000 to about 8000 $m^3/hr/m^2$, most preferably 3000 to 6000 $m^3/hr/m^2$. The basis weight of the filter web layer or layers are generally 10 to 200 $g/m^2$, preferably 50 to 100 $g/m^2$. If higher filtration efficiency is required, two or more filter layers may be used.

The nonwoven filter web can also include additive particles or fibers which can be incorporated in known manners such as disclosed in U.S. Pat. No. 3,971,373 or 4,429,001. For example, if odor removal is desired, sorbent particulates and fibers could be included in the nonwoven electret filter layer web or in a web joined to this filter layer web.

The air filter element can be in the form of a general planar element such as a fan blade or a fan blade insert. Nonplanar forms of the filter element are also possible such as a V-shaped wedge or a structured sheet-like shape such as an array of adjacent peaks or valleys, or the like. The air filter element generally is formed by air filter media (e.g., of a fibrous filter) and support elements. The fibrous filter can be one or multiple layers of fibrous filter web materials which filter web may have protective cover layers on one or both faces. The protective cover layers are generally of a higher Frazier air permeability than the fibrous filter web generally at least 4000 $m^3/hr/m^2$, preferably at least 5000 $m^3/hr/m^2$ or higher, most preferably at least 7000 $m^3/hr/m^2$ or higher. The protective cover layers can be spunbond webs, spunlace webs, calandered nonwovens or otherwise thin strengthen nonwoven or woven materials. The protective cover layer generally is a nonextensible material when subject to the forces encountered by the filter media impacting the airstream.

Other than the filter media further functional layers can be included with the filter media layer or layers. These further functional layers can be other particulate filtration layers such as noncharged fibrous webs, foam filter layers, woven filter layers and the like. Nonparticle filtration layers useful as additional functional layers would include layers formed of, or including, particules or fibers capable of sorption or chemisorption such as adsorbents such as activated carbon particles or fibers, silica gel, or activated alumina.

The filter media support elements can be located on the ends of individual filter media elements, the sides of individual filter media elements or in the plane of the filter media. The support elements can be rigid or flexible but generally are provided to keep the filter media in place on the filter elements when the fan is rotated. If the support elements are located at the ends or sides of the filter media, generally the filter media is attached to the support elements for example, by mechanical clips, adhesive attachment, resin potting or the like. If support elements are located in the plane of the filter media generally at least some of the support elements are attached to the filter media to prevent the sidewise movement or slippage of the filter media along the filter element. Structural support elements on the downstream face of the filter media need not be intimately attached to the filter media as the rotational movement of the fan will press the filter media into frictional engagement with these support elements.

The air delivery device is preferably a centrifugal air delivery fan as shown in FIG. 1 having an axial air inlet 2 with air delivered radially 7 of the axis of rotation 6 of the fan 1. The air moving elements 4 have an upstream face 11 that is generally aligned with the axis of rotation and a downstream face 12. Upstream face 11 faces the direction of rotation 10 of the fan 1. The upstream face 11 is aligned with the axis of rotation 6 such that when the upstream face intersects the airstream it provides a substantially radial direction to the airflow.

The radial direction of the airflow out of the fan is best accomplished if the air moving elements 4, or at least its upstream face 11 is in a plane that is generally parallel with the axis of rotation 6, however, the air moving elements 4 can be at a slight incline. For example, the upstream face 11 can be in a plane which intersects the axis of rotation by about 5 to 10 degrees in either direction and still provide a substantially radial direction to the airflow 7. If the plane containing the upstream face 11 is at an angle to the axis of rotation 6, this angle is preferably provided so that any axial airflow component is pushed toward the face of the fan opposite the air inlet 2 face.

In the embodiment of FIG. 1, the air moving elements 4 extend radially outward from the axis of rotation. There are eight air moving elements 4, however, as few as two air moving elements are possible, preferably at least four. More air moving elements can be used as long as the spacing between adjacent air moving elements is at least 0.5, preferably at least 1.5 cm. Additional air moving elements at a spacing of less than 0.5 cm generally provide little added benefit. In the embodiment of FIG. 1, the air moving elements 4 also comprise the filter elements where the filter media 3 is retained by support elements 9. The filter media 3 is retained by two substantially identical support element frames 9 which support element frames 9 can be engaged with each other and the filter media by mechanical engagement, adhesives, or the like.

The filter elements extend in the direction perpendicular to the airflow 7 by a lengthwise extent 5. This lengthwise extent 5 extends from the air inlet edge 13 of the fan to the opposite edge 14. When the fan is placed in a housing, the housing sidewalls will preferably be closely adjacent both the air inlet edge 13, except in a central region corresponding to the air inlet 2, and the opposite edge 14. As such the filter element extends across the entire lengthwise extent 5 of the cross sectional area in the housing that is traversed by the air moving elements, through which passes the many portions of the airflow 7. If a substantial portion (e.g., more than 75 percent) of the lengthwise extent 5 were not provided with filter media (e.g., if all the top panels 16 were blocked off), substantial portions of the radial airflow would bypass, or move through, the fan and not intersect filter media 3 and be unfiltered. Relatively thin support elements 9 at the edges 14 and 13 (e.g., less than 1.3 cm) do not result in this effect due to the turbulent nature of the airflow. The filter element shown in FIG. 1 extends across the entire width 18 of the air moving element 4 from a leading edge 15 to a trailing edge 19. However, the filter element could extend over only a portion of the width 18 and still function to intersect substantially the entire airflow although with less filtration efficiency.

Figure 2:
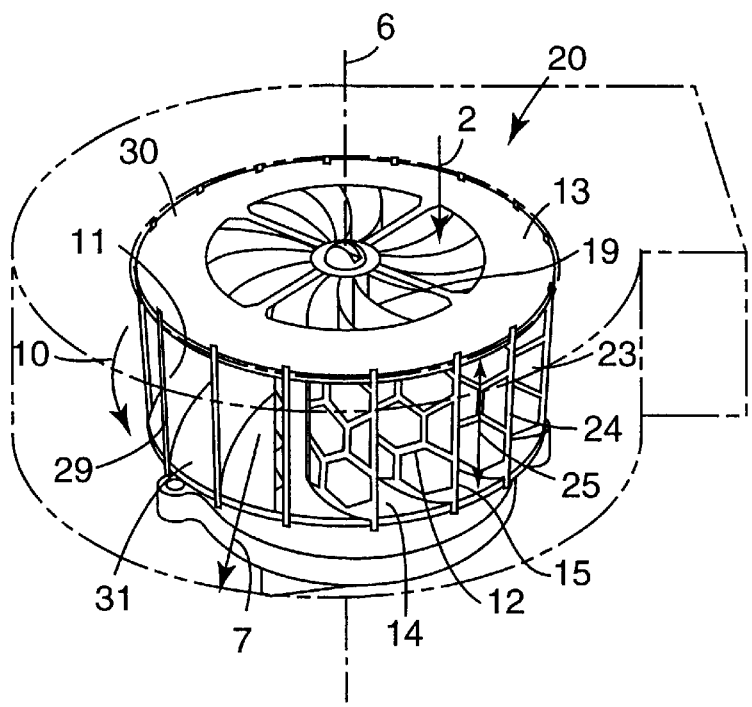
FIG. 2 is a perspective view of a filter according to a second embodiment of the invention.

FIG. 2 illustrates a second embodiment of a centrifugal fan 20 in accordance with the invention. In this embodiment, the air moving elements 24 are again filter elements formed of filter media 23 and support elements (29, 30 and 31). The filter media is attached to the support elements 29 such as by use of adhesive. The support elements 29 are in the plane of the filter media 23 and are on the downstream face 12 of the filter media. The filter media 23 of the filter elements extend across the entire lengthwise extent 25 of the air moving element 24 such that the entire airflow is ensured of contacting the filter element filter media 23 when the fan is rotated in the direction of rotation 10. The upper support plate 30 is provided with an air inlet opening 2. The bottom support plate 31 can be solid as no air is discharged axially out from this face of the fan. The support elements 29 are retained between the support plates 30 and 31.

The planar upstream face of the air moving element/filter element 24 is aligned with and parallel with the axis of rotation providing a substantially entirely radial airflow 7. The upstream face 11 in the FIG. 2 embodiment however, does not extend linearly in the radial direction as in the embodiment of FIG. 1 rather is curved in the radial direction from leading edge 15 to trailing edge 19. The air moving element and/or filter element can curve in either direction. In the FIG. 2 embodiment, the upstream face curves in the radial direction such that the concave face is the downstream face 12 and the convex face is the upstream face 11.

Figure 3:
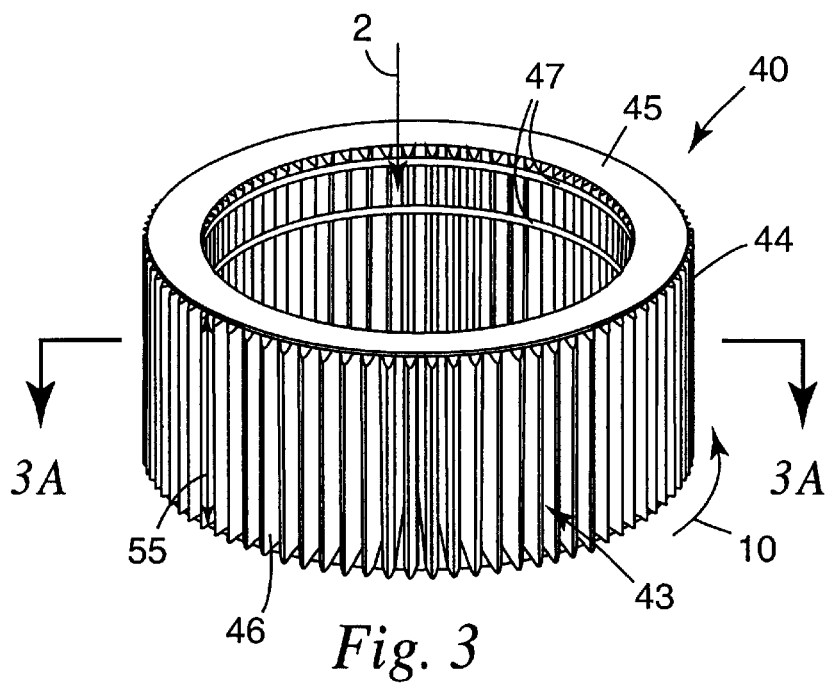
FIG. 3 is a perspective view of a filter according to a third embodiment of the invention.
Figure 3A:
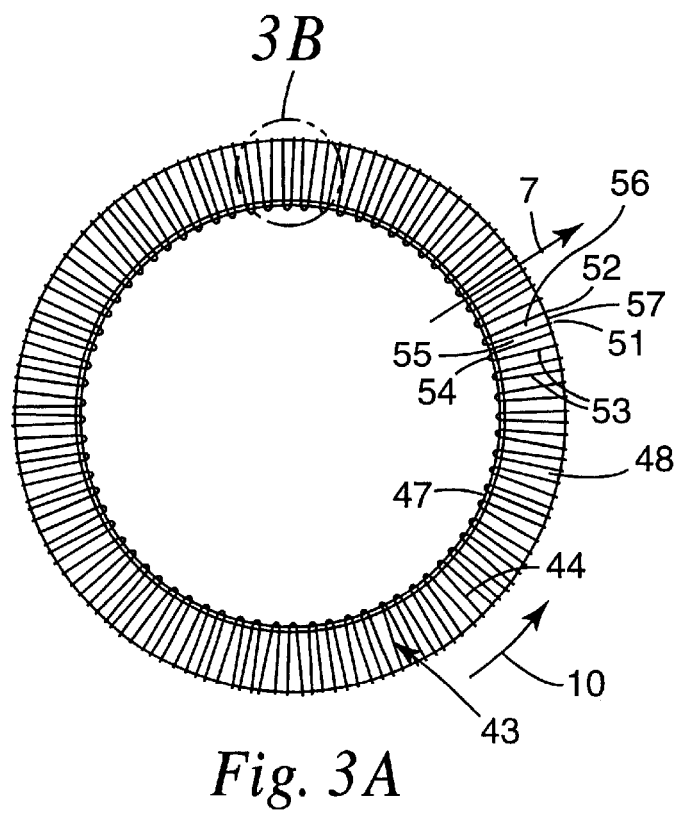
FIG. 3A is a cross-sectional view of the FIG. 3 embodiment.
Figure 3B:
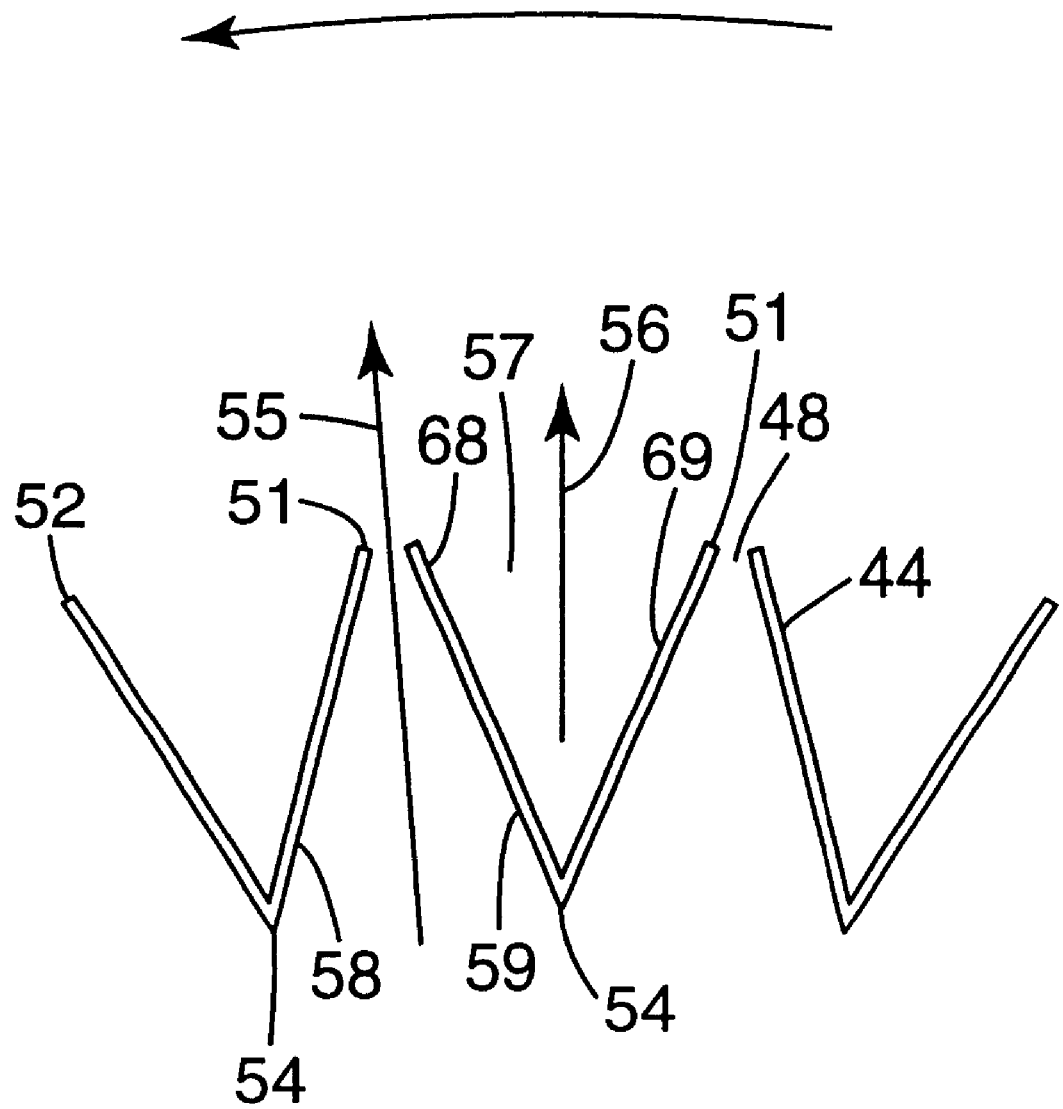
FIG. 3B is an exploded view of a cross sectional area of FIG. 3A

FIGS. 3, 3A and 3B illustrate a third embodiment of filter elements used in an air delivery fan of the invention. The filter elements 44 are formed from a zig-zag pleated filter media 43 supported by an upper annular support disk 45 and a lower annular support disk 46. The filter media 43 is preferably also supported by rigid support elements or by support bands 47 intersecting the tips or ends of the filter media on one or both outer annular surfaces. The filter media outer pleat tips are removed to create flow passages 48. Upstream face 58 and downstream face 59 of the pleated filter media create primary flow channel 55. The filter elements 44 as such are V or U-shaped with flow through primary air channels 55 formed between the upstream face 58, formed by the leading edge 51 and second trailing edge 54 of an adjacent filter element 44, and the downstream face 59 of an adjacent filter element 44, which downstream face 59 is formed between trailing edge 54 and trailing edge 52. This primary air channel 55 also forms an air passage. The air passages in this embodiment can be any appropriate size or shape but are generally at least 0.02 $cm^2$, preferably at least 0.06 $cm^2$ on average in its minimum cross sectional area. The cross sectional area of all the air flow passages for this embodiment (taken at their minimum cross sectional area for air flow passages that extend along an air channel) generally comprise from 5 to 25 percent, preferably 10 to 20 percent, of the total cross sectional area of the filter elements and any flow passages between adjacent filter elements.

A secondary air channel 56 is formed between a downstream face 69 formed between leading edge 51 and trailing edge 54 and a secondary upstream face 68, formed between trailing edge 54 and secondary trailing edge 52. This secondary air channel has an air outlet 57 but no air inlet. As such air entering air channel 56 from the downstream filter face 69 can form a secondary airflow and exit out an air flow passage formed by the air outlet gap 57 and rejoin the primary airflow 7.

Figure 4:
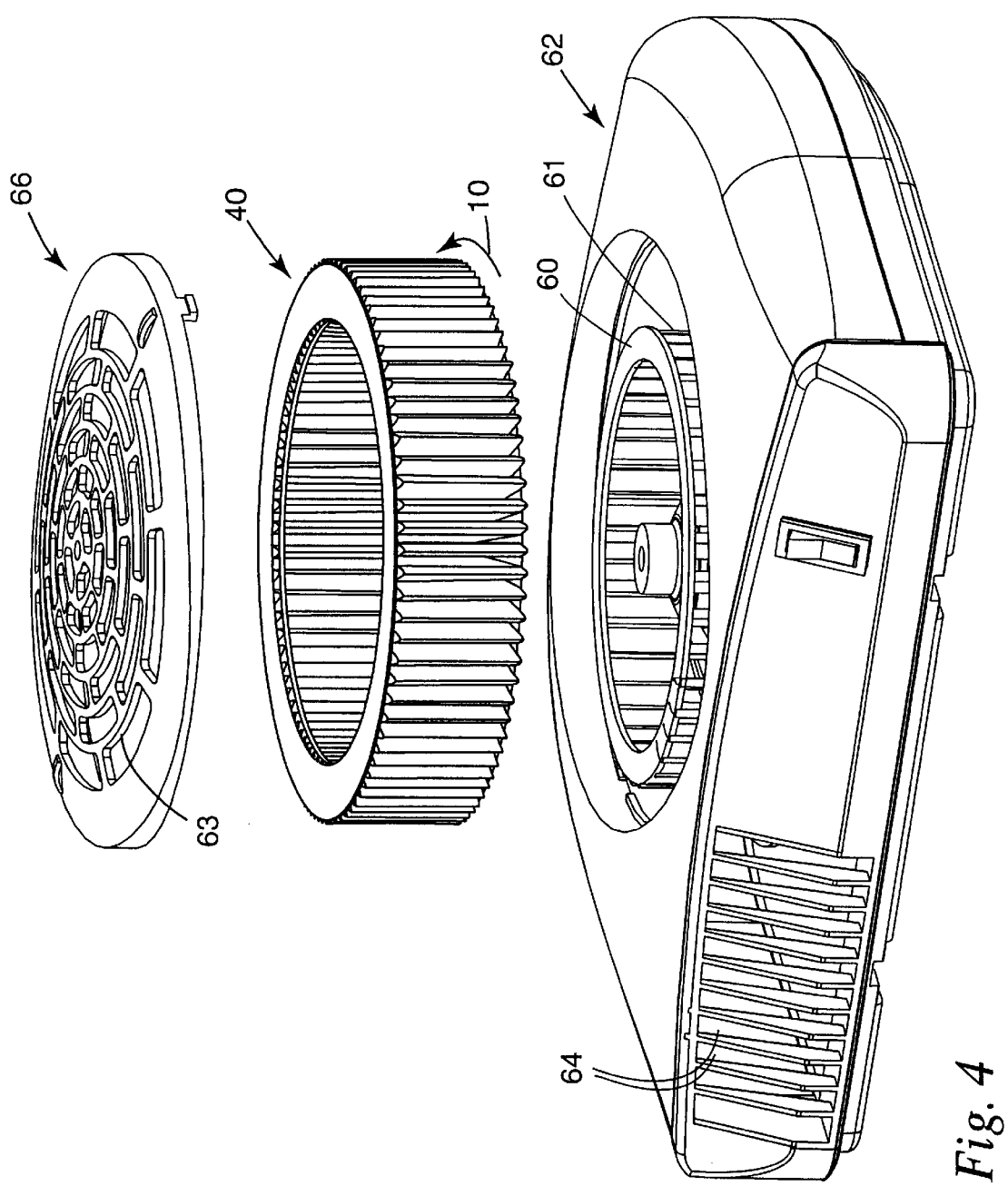
FIG. 4 is an exploded view of air delivery device in accordance with the present invention.

Annular filter 40 of FIGS. 3 and 3A can be attached to a fan 60 with separate air moving elements 61 in a housing as shown in FIG. 4. The air moving elements 61 are fan blades. The spacing between the leading and trailing edges (51 and 52) of adjacent filter elements creates airflow channels 55 that ensure that air can freely move into the air filter elements and outward as a radial airflow 7 even when the filter media 43 forming the filter elements 44 is fully loaded with particulates. Alternatively, the filter media could be provided with holes to form flow channels between upstream and downstream filter element faces to ensure continuous airflow even when the media is fully loaded.

FIG. 4 illustrates the filter of FIG. 3 used in a housing 62 having an air inlet 63 and an air outlet 64. The air moving elements 61 are spaced radially from the axis of rotation and form fan blades provided in an annular array on a radial blower wheel 60. The air inlet is provided on a cover 66 that fits onto the main housing 62. The radial airflow from the blower wheel is directed through the filter 40 where it intersects the upstream faces of the filter elements 44. The filter and its filter elements are shown radially outward of the air moving elements in FIG. 4, however, the filter and its filter elements could be located radially inward of the air moving elements of the fan by being located inside the blower wheel.

Figure 5:
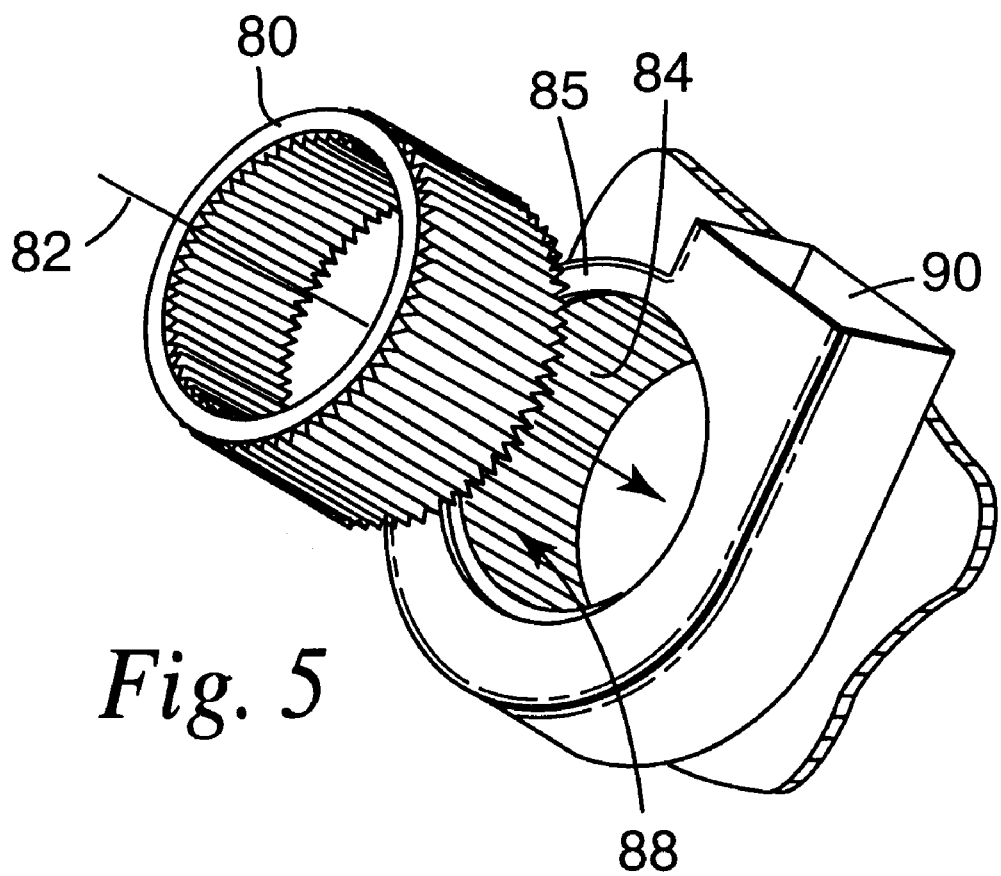
FIG. 5 is an exploded view of air delivery device in accordance with the present invention.

FIG. 5 illustrates a further embodiment of the invention where a filter 80 as shown in FIG. 3 is attached to a blower wheel 84 in a housing 85 of a centrifugal air delivery fan such as would be used in the HVAC system of a vehicle. The air inlet 82 is centrally located in the housing with the radial outlet 90 extending off the side designed to deliver air at a pressure head. The filter 80 engages the blower 82 by a friction fitting.

When the air moving means are formed by the filter elements as shown in FIGS. 1 and 2, preferably all the air moving means are formed in whole or in part by the filter elements to ensure filtration of the entire airflow. However, one or more air moving means can be formed other than as filter elements with a resulting decrease in filtration efficiency due to bypass of the airflow without intersecting any filter elements. Where air moving elements or a fan blade form a portion of the air moving means, preferably the air moving elements are at least 25 percent of the cross sectional area of air moving means, preferably at least 75 percent of the cross sectional area.

Although not preferred, the air delivery device can also be provided by a axial fan in which case the air moving elements and/or filter element intersect the axis of rotation of the fan. In this case, a substantial portion of the airflow is given an axial flow direction and the air outlet is located on the axial face of the air delivery fan opposite the air inlet face. The filter element (s) are preferably provided along the entire widthwise extent 18 of the air moving means to prevent any air bypass without filtration.

In operation the filter elements rotate in the direction of rotation intersecting the airstream and also imparting axial and/or radial movement to the airstream. At least 95 percent of the airstream is filtered by at least partially passing through the air filter element filter media. The filter elements are spaced relative to one another or otherwise provide air flow channels that permit the passage of air along or past the filter elements. Preferably these air flow channels have outlets located at the outermost edge of the filter element where the airstream moves away from the filter elements with flow channels being defined by adjacent upstream and downstream faces of the filter element(s).

The air flow passages in or through the air flow channels allow for the substantially unimpeded passage of air through the filter even when the filter elements are substantially loaded with particles. This allows the filter elements to operate without creating significant pressure drops over their useful life with nominal reductions in airflow through the filter device. The reduction in airflow of the filtration device over the useful life of the filter elements is generally less than 15 percent, preferably less than 10 percent, and most preferably less than 5 percent. The filter elements operate at decreasing efficiency as they become particle loaded due to the decrease in permeability and loading of the electret charged filter media.

Overall, the filter media operates best when in the preferred Frazier air permeability range, both initially and when fully or partially loaded with particles. Generally, at least 5 percent of the airflow should flow through the filter media in operation, preferably from 10 to 75 percent, and most preferably 10–50 percent. Higher percent airflow through the filter media is less desirable as there is reduced efficiency of the media due to the decreased basis weight needed to obtain this increase in airflow through the media. As permeability and the percent air passing through the media decreases with an uncharged filter media, the filtration performance generally stays the same or decreases. However, with the invention charged filter media, there is a significant increase in performance until the permeability decreases to less than 2000 $m^3/hr/m^2$. The inter-relationship between charged media and permeability is not fully understood, but it is clear that with a charged filtration media there is a significant increase in filtration performance with a moving filter device in accordance with the invention particularly in the preferred permeability ranges.

EXAMPLES

Test Procedures

Clean Air Delivery Rate

Clean air delivery rate provides a measure of the air cleaner performance by using an ANSI standard procedure entitled "Method for Measuring Performance of Portable Household Electric Cord-Connected Room Air Cleaners", ANSI/AHAM AC-1-1988, dated Dec. 15, 1988. This method was modified, as described below in the Time to Cleanup (Particulate Challenge) test, to accommodate and test a variety of filter systems and constructions. Clean Air Delivery Rate (CADR) is defined by the equation $$CADR = V(k_e - k_n)$$

Where V is the volume of the test chamber, $k_e(1/t_{min})$ is the measured decay rate of the particle count in the test chamber resulting from the operation of the air cleaning device being tested per the standard requirements, and $k_e(1/t_{min})$ is the natural decay rate of particle count in the test chamber in the absence of an air cleaning device.

Frazier Permeability

Frazier permeability, a measure of the permeability of a fabric or web to air, was determined according to Federal Test Standard 191A, Method 5450 dated Jul. 20, 1978.

Blower Pressure

Pressure developed by the mini-turbo fan assembly was defined as the difference between the dynamic pressure created between the leading and trailing faces of each blade component while rotation at a specified speed (i.e. the differential of the dynamic pressure across the filter media). This pressure was determined by using Bernoulli's equation of static pressure as described in "Fluid Mechanics" by V. L.

Streeter & E. B. Wylie, McGraw-Hill Book Co., pp. 101, 1979. The pressure developed by the centrifugal blower unit configuration is defined as the differential in air fluid pressure between the inlet of the blower assembly (i.e. the inlet of the scroll unit of the blower unit) and the dynamic pressure at the scroll outlet. The pressure drop of the moving filter in the centrifugal blower unit was determined by using Bernoulli's equation of static pressure mentioned above.

Time to Cleanup (Particulate Challenge)

This test was designed to characterize the rate at which a filter configuration reduced the particle count of a known volume of air in a re-circulation mode. The test chamber consisted of a "Plexiglas" box having a one cubic meter (m³) volume. The front sidewall of the test chamber was equipped with a door to allow placement of instrumentation, sensors, power supplies, etc. into the chamber. Each of the two adjacent sidewalls were each equipped with a 10 cm (4 inch) port which served as inlet and/or outlet ports to introduce or evacuate particles from the chamber. One of three smaller 3.8 cm (1.5 inches) diameter ports located on the back sidewall of the chamber was used to probe the particle level in the test chamber. The two other ports were fitted with 0.0254 m (1 inch) diameter 3M Breather Filters, Part No. N900 (available from 3M, St. Paul, Minn.) which exhibited 99.99% efficient capture of particles $\leq 0.3$ $\mu$m in size. The thus protected ports functioned as breathers to maintain a balanced atmospheric pressure between the test chamber and ambient surroundings. The interior of the test chamber was also equipped with power outlets that were controlled from outside the chamber. The particle challenge level was adjusted to a constant, controlled level prior to the start of each test by means of a portable room cleaner (available from Holmes Products Corp., Milford, Mass.). A recirculation fan (available from Duracraft Corp., Whitinsville, Mass.) was used to maintain a uniform mixing of the particulate challenge before the test started. This fan was set at maximum speed during re-circulation and turned off once particle testing started. The particle count analyzer (a "Portable Plus" HIAC/ROYCO particle counter, available from Pacific Scientific, Silver Spring, Md.) was connected to the test chamber by means of a 6.35 mm OD (¼ inch) tube which was 1.22 m (4 foot) in length. All openings into the test chamber were carefully sealed with gaskets or sealants to minimize particle leakage during testing.

All testing was conducted using background particles from the environment with an additional paper smoke load to bring the initial particle level to about $1.41 \times 10^8$ particles/m³ ($4 \times 10^6$ particles per cubic feet). The smoke generator consisted of a stick made of bond paper that was ignited and introduced in the test chamber for a few seconds. The resulting particle concentration was typically above the desired value and the room cleaner would be used to reduce the count to a constant baseline of $1.41 \times 10^8$ particles/m³ ($4 \times 10^6$ particles/ft³) for all tests. Once the desired particle concentration level was attained, the moving filter apparatus was turned on and the particle concentration of the chamber was sampled every 30 seconds at a rate of 5.66 liters/min (0.2 ft³/min) to generate the particle decay curve over a period of ten minutes. After each test the chamber was purged of particles. In addition to logging the particle decay curves, the voltage, amperage consumption and rpm's of each filter configuration was recorded using a Fluke instrument, model 87, Everett, Wash. The filtration performance characterization of each moving filter was made following the ANSI/AHAM AC-11-1988 standard. Variations to the standard were the test chamber dimensions, re-circulation fan size, no humidity control, use of a manual smoke generator (paper smoke), frequency of data taking and length of the test (10 minutes).

Web Thickness

Web thickness was measured using an electronic digital caliper, Model 721B, available from Starrett, Athol, Mass.

Airflow Through Filter Media

Airflow through the various media used as filter material was calculated according to the formula:

$$\text{Flow (m}^3\text{/hr)} = (Q_M/Q_S) \times 100$$

where $Q_M$=Calculated flow through the media using the equation PERM×filter area;

where PERM is defined below.

$Q_S$=Flow delivered by the system due to the media, and is calculated as the difference $Q_C - Q_F$, where $Q_F$, the airflow due to the frame of the fan blades, was determined by operating the mini turbo fan (described below) at the indicated speed (rpms determined by a stroboscope, (model 1000, available from Ametek Inc., Largo, Fla.) recording the voltage and current draw corresponding to the rotational speed for subsequent calculations, determining the air velocity (an average of three data points) at the fan outlet using a hand held anomometer, (Model "Velocicalc Plus", available from TSI Inc., St. Paul, Minn.), and calculating the flow rate $Q_F$ by multiplying the air velocity times the cross-sectional area of the outlet.

$Q_C$, the combined airflow due to the filter media and frame, was determined using a procedure identical to that used to determine $Q_F$ except that the bare turbo blade frames were replaced with frames fitted with filter media.

PERM, the permeability of the filter media on a moving turbo blade, was calculated using the equation:

$$\text{PERM} = (\text{Frazier permeability} \times P_A) / P_B$$

where

Frazier permeability for the filter media was determined as described above;

$P_A$, the pressure exerted on the filter media of a moving turbo blade, was calculated using the formula:

$$P_A = F_M / \text{Filter area}$$

where $F_M$, the force exerted on the media, defined as $T_M/(\frac{2}{3})R$, where $T_M$ is the torque exerted on the media and R is the radius of the mini turbo impeller. This calculation was based on the assumptions that the velocity profile on the media was triangular, zero at the axis and maximum at the blade tip, that the net force acted at ⅔ of the impeller radius, and that torque $T_M$ could be calculated as the difference between the torque with filter media on the turbo blades and torque with only the turbo blade frames as calculated from the torque/current relationships for the electric motor used in the blower.

$P_B$, the pressure on the face of the moving filter media in the blower, was determined by placing a sample of the filter media from the turbo fan blade in a TSI Model 8110 Automated Filter Tester apparatus (available from TSI Inc.), adjusting the flow rate through the media to that calculated for an individual turbo blade (⅛ of the total flow rate), and obtaining a value for $P_B$ as a standard machine output.

Test Configurations

Mini Turbo Fan

The mini turbo fan consisted of a centrifugal flat blade filter configuration. The DC fan motor, a 9 cm Disc motor, (Part No. 090SF10, available from Hansen Corporation, Princeton, Ind.), was secured to a mounting panel which allowed the motor to be positioned outside the scroll unit with only the motor shaft extending into the scroll unit to allow mounting of the fan blades. A scroll housing, designed using standard fan & blower design principles using a 10 degree diffuser angle, was constructed from art poster board (1.2 mm thickness, Cat. No. 666, available from Crescent Cardboard Co., Wheeling Ill.) which was glued together using a hot melt adhesive. The scroll unit was 6.35 cm in height, the inlet was 14.3 cm in diameter, the rectangular outlet was 10.8×5.7 cm in cross-section, and the air expansion ratio of the scroll was 1:8. The shaft of the motor was equipped with an 1.9 cm aluminum hub having eight uniformly spaced dovetail slots which received the rectangular frame units of the individual fan blades. The frames, which were 5.1 cm×5.7 cm (2 in.×2.25 in.) in dimension with a central, longitudinal support element, were machined from PVC plastic. The assembled circular cross-section of the unit was approximately 14 cm in diameter. Power was supplied to the motor by a variable voltage power source, which allowed the speed of the fan to be controlled and power consumption of the motor to be monitored.

Add-on Filter Configuration

A centrifugal blower assembly having a blower wheel 15.25 cm outside diameter, 13.0 cm inside diameter and blade height of 4.3 cm with 38 forward curved blades was used for this test configuration. The blower assembly was driven by a DC motor, which was connected to variable voltage power source allowing the speed of the fan to be controlled and power consumption of the motor to be monitored. The scroll was designed using standard fan & blower design principles. The diffuser angle of the scroll was 8 degrees. Filter elements used in conjunction with this test configuration were sized to fit exterior to the fan blades on the blower wheel.

Automotive HVAC Configuration

A dash assembly, including the air circulation ducting components, was removed from a Ford Taurus and used in this test configuration. An access panel was cut into the blower housing to allow various filter element configurations to be inserted into the blower wheel of the unit. Power was supplied to the motor by a variable voltage power source, which allowed the speed of the fan to be controlled and power consumption of the motor to be monitored. A 15 cm diameter, 130 cm long duct was connected to the inlet side of the HVAC system. A hot wire anemometer (Model "Velocicalc Plus") was mounted at the end of the duct to measure the airflow rate. A manometer was used to measure the pressure developed across the blower wheel with the full HVAC system in place. A second, identical, HVAC system was then modified by removing the coils, ducting, and cutting the exit side of unit to a size which would fit into the cubic meter box. A solid, sliding baffle plate was placed on the exit of the modified system to enable the system flow and pressure to be adjusted to duplicate the flow and pressure parameters of the system prior to what it had been before several components were removed. This modified unit was then used for all particulate and gas testing. The original full HVAC system was used for all further flow, and power measurements.

Particulate Filter Media

GSB30

A charged fibrillated film filtration media having a basis weight of 30 g/m$^2$ (available from 3M Co., St. Paul, Minn. under the designation "FITRETE" Air Filter Media Type GSB30).

GSB50

A charged fibrillated film filtration media having a basis weight of 50 g/m$^2$ (available from 3M Co. under the designation "FITRETE" Air Filter Media Type GSB50).

GSB70

A charged fibrillated film filtration media having a basis weight of 70 g/m$^2$ (available from 3M Co. under the designation "FITRETE" Air Filter Media Type GSB70).

GSB150

A charged fibrillated film filtration media having a basis weight of 150 g/m$^2$ (available from 3M Co. under the designation "FITRETE" Air Filter Media Type GSB150).

Meltblown

A charged blown microfiber web having fiber diameters in the range of 0.3 μm to 5 μm and basis weight of 70 g/m$^2$. The web prepared substantially as described in Report No. 4364 of the Naval Research Laboratories, published May 25, 1954, entitled "Manufacture of Super Fine Organic Fibers" by Van Wente et. al. and charged substantially as described in U.S. Pat. No. 4,749,348 (Klaase et. al.)

Fiber Glass

A commercially available 70 g/m$^2$ fiber glass paper with 95% ASHRE efficiency, available from Bernard Dumas S. A., Creysse, France, under the designation B-346W.

Paper

A white, 100% cellulosic paper available from Georgia Pacific Papers, Atlanta, Ga., under the designation Spectrum-Mimeo, 75 g/m$^2$.

Filter Assembly

Mini Turbo Fan Blades

The filter media was cut into rectangular pieces 5.1 cm×5.7 cm (2 in.×2.25 in.) in size, a thin bead of hot melt adhesive (Jet Melt, Product No. 3748-Q, available from 3M) was applied to the perimeter and central support member of the fan blade frame, a piece of the filter media was placed on the hot adhesive and slight hand pressure was applied. The adhesive was allowed to cool before any testing.

Pleated Filter Cartridges

A rectangular piece of the filter media (sized to provide the desired length of pleated filter media (dependant on the diameter of the blower wheel, pleat depth and pleat density) was formed into pleats using a "Rabofsky" pleater, (available from Rabofsky GmbH, Berlin, Germany). The pleated strip was mounted on a jig to hold the pleat tips at the desired spacing and two pieces of adhesive thread ("String King", available from H.B. Fuller Co., St. Paul Minn.) were attached across the pleat tips to secure their spacing. The spaced, stabilized pleat pack was then wrapped around the blower wheel (or inserted into the blower wheel) and pleats were trimmed to produce a precise fit. The pleat pack was then removed from the blower wheel, the two ends of the pleat pack were brought together to form a continuous loop and two pieces of adhesive thread about used to span across the inner pleat tips, securing the pleat pack into a cylindrical shape. Two annular poster board rings having the same diameter as the pleated cylinder were attached to the top and bottom of the filter structure using a hot melt adhesive to maintain the cylindrical shape of the filter. The outer diameter tips of the pleated filter constructions were optionally left intact or slit, to provide a by-pass configuration, prior to testing.

Example 1

The filtration performance of several filter media as a function of the permeabilty of the media was studied using Time to Cleanup (Particulate Challenge) test described above. A mini turbo fan was fitted with each of the indicated filter media and placed in the test apparatus, a known particulate L challenge introduced into the box, and the fan operated at 2900 rpm. Particle count data for these studies are reported in TABLE 1.

TABLE 1

Particle count vs. Time
(Particle Count × $10^5$)

| Time (min) | Baseline | GSB30 | GSB50 | GSB70 | GSB150 | Melt Blown | Fiber Glass | Paper |
|---|---|---|---|---|---|---|---|---|
| 0 | 3.08 | 3.10 | 3.11 | 3.11 | 3.12 | 3.11 | 3.07 | 3.08 |
| 0.5 | 3.05 | 3.00 | 2.97 | 2.93 | 2.83 | 3.00 | 2.97 | 3.01 |
| 1.0 | 3.02 | 2.86 | 2.74 | 2.69 | 2.27 | 2.78 | 2.84 | 2.94 |
| 1.5 | 2.98 | 2.68 | 2.49 | 2.21 | 1.65 | 2.52 | 2.70 | 2.87 |
| 2.0 | 2.95 | 2.48 | 2.21 | 1.79 | 1.10 | 2.22 | 2.56 | 2.79 |
| 2.5 | 2.91 | 2.27 | 1.92 | 1.38 | 0.700 | 1.89 | 2.41 | 2.71 |
| 3.0 | 2.89 | 2.05 | 1.64 | 1.05 | 0.441 | 1.58 | 2.25 | 2.64 |
| 3.5 | 2.85 | 1.83 | 1.38 | 0.772 | 0.277 | 1.29 | 2.09 | 2.57 |
| 4.0 | 2.82 | 1.62 | 1.14 | 0.561 | 0.173 | 1.03 | 1.95 | 2.49 |
| 4.5 | 2.78 | 1.43 | 0.949 | 0.405 | 0.112 | 0.819 | 1.79 | 2.40 |
| 5.0 | 2.75 | 1.25 | 0.775 | 0.296 | 0.071 | 0.636 | 1.63 | 2.32 |
| 5.5 | 2.71 | 1.10 | 0.632 | 0.213 | 0.050 | 0.495 | 1.50 | 2.24 |
| 6.0 | 2.68 | 0.937 | 0.515 | 0.156 | 0.038 | 0.386 | 1.36 | 2.15 |
| 6.5 | 2.65 | 0.815 | 0.419 | 0.117 | 0.030 | 0.301 | 1.24 | 2.08 |
| 7.0 | 2.62 | 0.701 | 0.348 | 0.085 | 0.025 | 0.233 | 1.12 | 2.00 |
| 7.5 | 2.58 | 0.592 | 0.287 | 0.063 | 0.022 | 0.183 | 1.01 | 1.91 |
| 8.0 | 2.55 | 0.511 | 0.235 | 0.049 | 0.018 | 0.143 | 0.901 | 1.84 |
| 8.5 | 2.51 | 0.447 | 0.196 | 0.038 | 0.016 | 0.112 | 0.807 | 1.75 |
| 9.0 | 2.48 | 0.383 | 0.163 | 0.030 | 0.016 | 0.091 | 0.727 | 1.68 |
| 9.5 | 2.45 | 0.330 | 0.136 | 0.023 | 0.014 | 0.074 | 0.651 | 1.60 |
| 10.0 | 2.40 | 0.290 | 0.119 | 0.020 | 0.013 | 0.061 | 0.586 | 1.54 |

Examination of the data in TABLE 1 shows that when operating at comparable conditions in a "moving filter" configuration, more porous filtration materials (i.e. GSB30, GSB50, GSB70, GSB150, and meltblown) are more effective in removing particles than less permeable materials (i.e. fiber glass, & paper).

Figure 6:
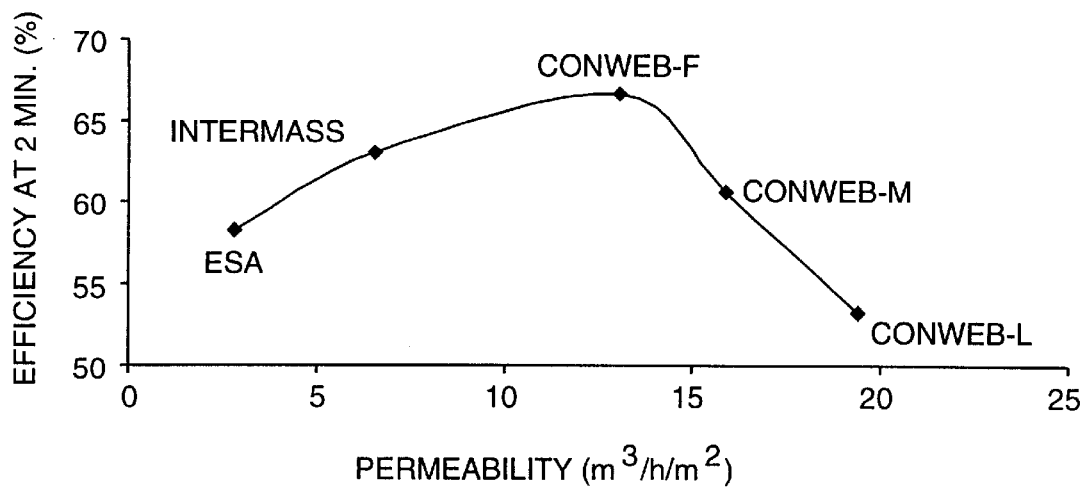
FIG. 6 is a graph of clean air delivery rate (CADR) verses filter media permeability as described in Example 1.

The Clean Air Delivery Rate (CADR) calculated on the data shown in TABLE 1 for the various filtration media are shown in TABLE 2 and graphically presented in FIG. 6, where the CADR is compared to the permeability of the filtration media.

TABLE 2

CADR vs. Media Permeability

| Filtration Material | Frazier Permeability[1] | | CADR[2] | |
|---|---|---|---|---|
| | $m^3/h/m^2$ | $ft.^3/h/ft^2$ | $m^3/h$ | $ft.^3/min$ |
| GSB30 | 10,122 | 553.5 | 13.8 | 8.1 |
| GSB50 | 7,888 | 431.3 | 20.0 | 11.8 |
| GSB70 | 5,969 | 326.4 | 32.5 | 19.1 |
| GSB150 | 3,261 | 178.3 | 45.7 | 26.9 |
| Meltblown | 2,011 | 110 | 24.6 | 14.5 |
| Fiber Glass | 554 | 30.3 | 10.0 | 5.9 |
| Paper | 6.4 | 0.35 | 2.7 | 1.6 |

[1]Determined as described in the Frazier Permeability test procedure above.
[2]Calculated as described in the "Method for Measuring Performance of Portable Household Electric Cord-Connected Room Air Cleaners," ANSI/AHAM AC-1-1988.

The inter-relationship of media permeability (Frazier Permeability) and CADR is readily apparent from an examination of the data in TABLE 2 suggests that the two parameters can be balanced against each other depending on the requirements of the application.

Example 2

The filtration performance of a filter media as a function of changing permeability of the media was studied using the Time to Cleanup (Particulate Challenge) test. GSB70 media, GSB70/posterboard laminate (prepared by laminating the poster board to the GSB70 media with a bead of hot melt adhesive along the edge of the poster board), and a cellulosic paper filter media (described above) were used as filter media in this study. The mini turbo fan was sequentially fitted with each of the materials mentioned above, the mini turbo fan placed in the test apparatus, a known particulate challenge introduced into the box and the fan operated at 2900 rpm. Particle count data for these studies are reported in TABLE 3.

TABLE 3

Particle Removal vs. Blade Porosity
(Particle Count × 10⁵)

| Time (minutes) | Baseline | GSB70 | GSB70/Poster Board Laminate | Paper |
|---|---|---|---|---|
| 0 | 3.08 | 3.11 | 3.11 | 3.08 |
| 0.5 | 3.05 | 2.93 | 3.00 | 3.01 |
| 1.0 | 3.02 | 2.60 | 2.85 | 2.94 |
| 1.5 | 2.98 | 2.21 | 2.69 | 2.87 |
| 2.0 | 2.95 | 1.79 | 2.51 | 2.79 |
| 2.5 | 2.91 | 1.38 | 2.31 | 2.71 |
| 3.0 | 2.89 | 1.05 | 2.10 | 2.64 |
| 3.5 | 2.85 | 0.772 | 1.90 | 2.57 |
| 4.0 | 2.82 | 0.560 | 1.69 | 2.49 |
| 4.5 | 2.78 | 0.405 | 1.49 | 2.40 |
| 5.0 | 2.75 | 0.296 | 1.30 | 2.32 |
| 5.5 | 2.71 | 0.213 | 1.14 | 2.24 |
| 6.0 | 2.68 | 0.156 | 0.973 | 2.15 |
| 6.5 | 2.65 | 0.117 | 0.845 | 2.08 |
| 7.0 | 2.62 | 0.085 | 0.721 | 2.00 |
| 7.5 | 2.58 | 0.063 | 0.620 | 1.91 |
| 8.0 | 2.55 | 0.049 | 0.539 | 1.84 |
| 8.5 | 2.51 | 0.038 | 0.454 | 1.75 |
| 9.0 | 2.48 | 0.030 | 0.388 | 1.68 |
| 9.5 | 2.45 | 0.023 | 0.333 | 1.60 |
| 10 | 2.40 | 0.020 | 0.288 | 1.54 |
| CADR | | 32.3 | 8.1 | 1.6 |

Examination of the data shown in TABLE 3 clearly shows that superior particle removal rates are realized when more airflows through the filter media (unbacked vs. backed GSB70). The calculated CADRs for the GSB70, GSB70/paper laminate and paper filter configurations based on the data of TABLE 3 of 32.5 m³/h (19.1 ft.³/h), 8.1 m³/h (13.7 ft.³/h), and 1.6 m³/h (2.8 ft.³/h), respectively, for the three media configurations further substantiates the importance of airflow through the filter media to achieve good filtration performance.

Example 3

Filtration performance of two identical pleated filter constructions in "moving" and "static" configurations were studied using the Time to Cleanup (Particulate Challenge) test described above. In this study the mini-turbo fan was replaced with the Add-on Filter test unit (described above) wherein the filter elements in both configurations were placed outside the blower wheel.

The filter elements were assembled as described above using GSB70 media approximately 2.55 m (8.4 feet) by 4.13 cm (1.62 inches), which was converted into a pleated filter cartridge with an OD of 19 cm (7.5 in.), an ID of 15.75 cm (6.2 in.) and a height of 4.13 cm (1.62 in.), and having 85 pleats at a 6 mm spacing. Subsequent to assembly into the cartridge, the pleat tips were slit.

The "moving" filter cartridge was mounted directly onto the blower wheel. The "static" filter was positioned just off the surface of the blower wheel by mounting it to the stationary scroll housing such that it did not contact the blower wheel in operation. In both tests, the Add-on Filter test unit was operated at 13 volts and the particle count of the test chamber monitored. Particle count data for the two test configurations are summarized in TABLE 4.

TABLE 4

"Moving" vs. "Static"
Filtration Performance
(% Cleanup)

| Time (Minutes) | Baseline | "Moving" | "Static" |
|---|---|---|---|
| 0 | 3.08 | 0.00 | 0.00 |
| 0.5 | 3.05 | 11.7 | 9.0 |
| 1.0 | 3.02 | 33.1 | 21.5 |
| 1.5 | 2.98 | 54.5 | 37.0 |
| 2.0 | 2.95 | 72.5 | 51.1 |
| 2.5 | 2.91 | 84.4 | 64.7 |
| 3.0 | 2.89 | 91.1 | 74.9 |
| 3.5 | 2.85 | 94.8 | 82.5 |
| 4.0 | 2.82 | 97.1 | 88.0 |
| 4.5 | 2.8 | 98.3 | 91.8 |
| 5.0 | 2.75 | 98.9 | 94.5 |
| 5.5 | 2.71 | 99.3 | 96.2 |
| 6.0 | 2.68 | 99.5 | 97.4 |
| 6.5 | 2.65 | 99.7 | 98.1 |
| 7.0 | 2.62 | 99.8 | 98.7 |
| 7.5 | 2.58 | 99.8 | 99.0 |
| 8.0 | 2.55 | 99.8 | 99.3 |
| 8.5 | 2.51 | 99.8 | 99.5 |
| 9.0 | 2.48 | 99.9 | 99.6 |
| 9.5 | 2.45 | 99.9 | 99.7 |
| 10.0 | 2.40 | 99.9 | 99.7 |
| CADR (m³/h) | | 36.6 | 25.5 |

While both the "moving" and "static" filter configurations eventually reached similar particle concentrations in the test apparatus, it is apparent from an examination of the data in TABLE 3 that the "moving" filter configuration was able to reduce the particle count more rapidly than the "static" filter configuration. This performance difference is also reflected in the calculated CADR for the "moving" filter configuration and the "static" filter configuration (36.6 m³/h vs. 25.6 m³/h).

Example 4

The mini turbo fan apparatus was used to study the effect of charge on the filtration media of a "moving" filter configuration.

Filtration performance of GSB70 media and GSB70 media which had been discharged by washing the media in isopropyl alcohol were used as the filter media for this study. The mini turbo fan was sequentially fitted with the two filter media, the mini turbo fan placed in the Time to Cleanup (Particulate Challenge) apparatus, a known particulate challenge introduced into the box, and the fan operated at 2800 rpm. Particle count data for these studies are reported in TABLE 5.

TABLE 5

Effect of Charge on Filtration Performance
(Particle Count × 10⁵)

| Time (Minutes) | Baseline | Charged GSB70 | Uncharged GSB70 |
|---|---|---|---|
| 0 | 3.08 | 3.11 | 3.08 |
| 0.5 | 3.05 | 2.93 | 3.00 |
| 1.0 | 3.02 | 2.69 | 2.89 |
| 1.5 | 2.98 | 2.21 | 2.76 |
| 2.0 | 2.95 | 1.79 | 2.62 |
| 2.5 | 2.91 | 1.38 | 2.48 |
| 3.0 | 2.89 | 1.05 | 2.33 |
| 3.5 | 2.85 | 0.772 | 2.17 |

TABLE 5-continued

Effect of Charge on Filtration Performance
(Particle Count × 10⁵)

| Time (Minutes) | Baseline | Charged GSB70 | Uncharged GSB70 |
|---|---|---|---|
| 4.0 | 2.82 | 0.561 | 2.00 |
| 4.5 | 2.8 | 0.405 | 1.86 |
| 5.0 | 2.75 | 0.296 | 1.69 |
| 5.5 | 2.71 | 0.213 | 1.56 |
| 6.0 | 2.68 | 0.156 | 1.42 |
| 6.5 | 2.65 | 0.117 | 1.29 |
| 7.0 | 2.62 | 0.085 | 1.17 |
| 7.5 | 2.58 | 0.063 | 1.06 |
| 8.0 | 2.55 | 0.049 | 0.962 |
| 8.5 | 2.51 | 0.038 | 0.867 |
| 9.0 | 2.48 | 0.030 | 0.787 |
| 9.5 | 2.45 | 0.023 | 0.706 |
| 10.0 | 2.40 | 0.020 | 0.629 |
| CADR (m³/h) | | 32.5 | 8.5 |

The calculated CADRs for the charged GSB70 and uncharged GSB70 filter media based on the data in TABLE 5 of 32.5 m³/h and 8.5 m³/h respectively for the two media, the data in TABLE 5 clearly demonstrate that charged media provides superior filtration performance to uncharged media in moving filter configurations.

Example 5

Filtration performance as a function of the speed of the moving filter was studied using the mini turbo filter apparatus.

A mini turbo fan having GSB70 filtration media on its blades (prepared as described above) was placed in the Time to Cleanup (Particulate Challenge) apparatus, a known particulate challenge introduced into the box, and the fan operated at the speed indicated in TABLE 6. (The fan blades were replaced with new blades having new filtration media for each test speed.) Particle count data for these studies are reported in TABLE 6.

TABLE 6

Filtration Performace vs. Filter Speed
(Particle Count × 10⁵)

| Time (min.) | Filter Speed (rpm) | | | | | | |
|---|---|---|---|---|---|---|---|
| | 2900 | 2500 | 2100 | 1700 | 1300 | 900 | 500 |
| 0 | 3.10 | 3.12 | 3.10 | 3.10 | 3.12 | 3.08 | 3.11 |
| 0.5 | 2.88 | 2.98 | 2.96 | 3.00 | 3.04 | 3.05 | 3.07 |
| 1.0 | 2.48 | 2.74 | 2.75 | 2.84 | 2.92 | 2.96 | 3.02 |
| 1.5 | 2.00 | 2.43 | 2.52 | 2.65 | 2.80 | 2.87 | 2.97 |
| 2.0 | 1.54 | 2.10 | 2.23 | 2.45 | 2.65 | 2.78 | 2.93 |
| 2.5 | 1.12 | 1.75 | 1.96 | 2.23 | 2.50 | 2.68 | 2.87 |
| 3.0 | 0.804 | 1.42 | 1.68 | 1.99 | 2.34 | 2.58 | 2.82 |
| 3.5 | 0.567 | 1.13 | 1.42 | 1.77 | 2.16 | 2.47 | 2.76 |
| 4.0 | 0.396 | 0.880 | 1.20 | 1.55 | 1.99 | 2.37 | 2.70 |
| 4.5 | 0.281 | 0.680 | 0.986 | 1.36 | 1.81 | 2.27 | 2.64 |
| 5.0 | 0.204 | 0.530 | 0.818 | 1.16 | 1.65 | 2.15 | 2.57 |

TABLE 7

Calculated Clean Air Delivery Rate vs.
Fan Blade Speed

| Rpm | Velocity (m/sec) | Velocity (Ft./min) | CADR (m³/h) | CADR (ft.³/min.) |
|---|---|---|---|---|
| 2900 | 21.2 | 4176 | 33.3 | 19.6 |
| 2500 | 18.3 | 3600 | 20.4 | 12 |
| 2100 | 15.4 | 3024 | 15.6 | 9.2 |
| 1700 | 12.4 | 2448 | 11.6 | 6.8 |
| 1300 | 9.5 | 1872 | 7.8 | 2.9 |
| 900 | 6.6 | 1296 | 4.9 | 2.9 |
| 500 | 3.7 | 720 | 3.1 | 1.8 |

It is apparent from an examination of the data in TABLE 6 and the calculated CADR shown in TABLE 7 that the filtration performance of the GSB70 media showed a decided improvement as the speed of the mini turbo fan was increased. It is recognized that this data is unique to the test configuration described in a recirculation mode, and, as such, no absolute speed/filtration performance values can be defined which will apply to all filtration applications. However, the data does show a definite inter-relationship between the filter speed and filtration performance, which needs to be optimized for each combination of filter media and apparatus configuration.

Example 6

The mini turbo fan was used as a model to calculate the percentage of air passing through various filtration media as a function of the rotational speed of the filter media. An average velocity, taken at ⅔ of the diameter of the mini turbo fan blade assembly, and the Frazier permeability were used to calculate the airflow through the various media, the results of which are reported in TABLE 8 and graphically presented in FIG. 7.

TABLE 8

Percent Air Passing Through Filter Media
vs. Filter Speed

| Speed (rpm) | $V_{ave}$ (m/sec) | GSB30 | GSB50 | GSB70 | GSB150 | Melt blown | Fiber Glass |
|---|---|---|---|---|---|---|---|
| 500 | 2.2 | 19.2 | 21.1 | 15.6 | 5.6 | 2.7 | 0.3 |
| 900 | 4.0 | 24.1 | 18.3 | 14.1 | 4.2 | 2.8 | 0.2 |
| 1300 | 5.8 | 32.7 | 17.7 | 10.9 | 6.7 | 2.5 | 0.4 |
| 1700 | 7.5 | 37.8 | 21.6 | 15.0 | 8.0 | 4.0 | 0.5 |
| 2100 | 9.3 | 47.6 | 30.0 | 19.2 | 12.3 | 5.0 | 0.8 |
| 2500 | 10.6 | 62.6 | 42.7 | 28.8 | 14.2 | 5.8 | 1.0 |
| 2900 | 12.9 | 73.5 | 45.5 | 31.6 | 17.9 | 6.9 | 1.0 |

The CADR for the various media was subsequently calculated for 2900 rpm, the results of which are shown in TABLE 9 and are graphically presented in FIG. 8.

TABLE 9

Percent Air Passing Through Filter Media
vs. Clean Air Delivery Rate (CADR)

| Media | % Air Passing Through Media | CADR (m³/h) |
|---|---|---|
| GSB30 | 73.5 | 13.8 |
| GSB50 | 45.5 | 20 |
| GSB70 | 31.6 | 32.5 |

TABLE 9-continued

Percent Air Passing Through Filter Media vs. Clean Air Delivery Rate (CADR)

| Media | % Air Passing Through Media | CADR (m³/h) |
|---|---|---|
| GSB150 | 17.9 | 45.7 |
| Meltblown | 6.9 | 24.6 |
| Fiber Glass | 1.0 | 10 |
| Paper | 0 | 2.7 |

Figure 7:
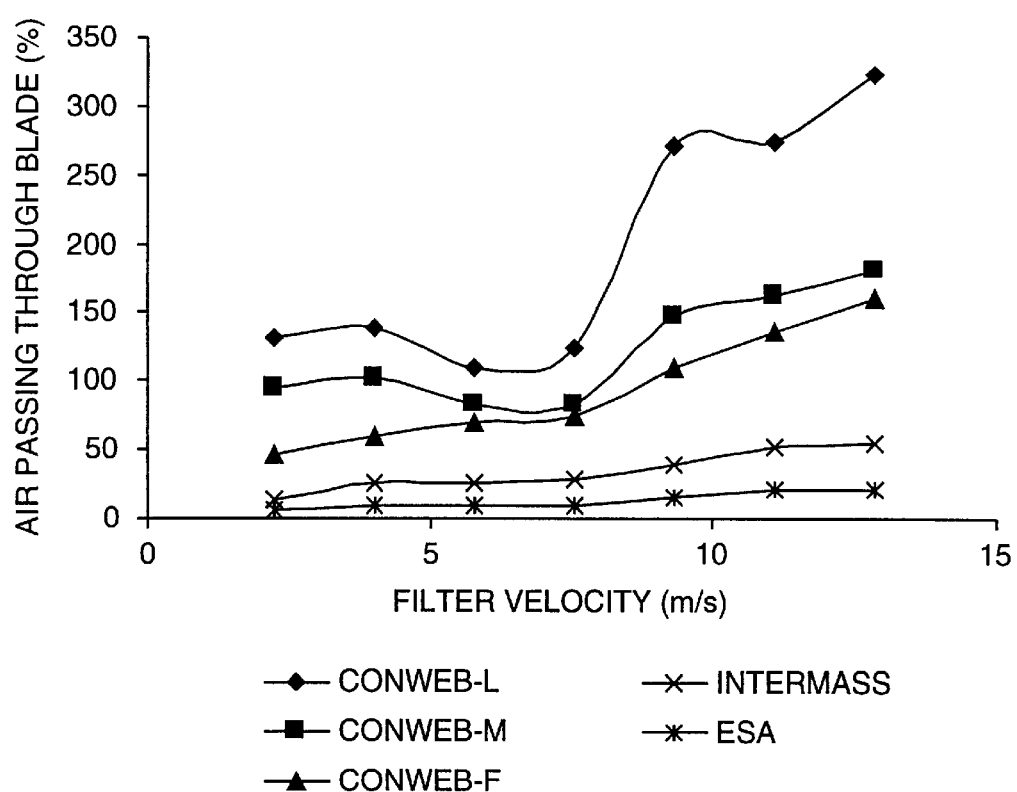
FIG. 7 is a graph of percentage of air passing through a filter blade versus filter blade velocity as described in Example 6.
Figure 8:
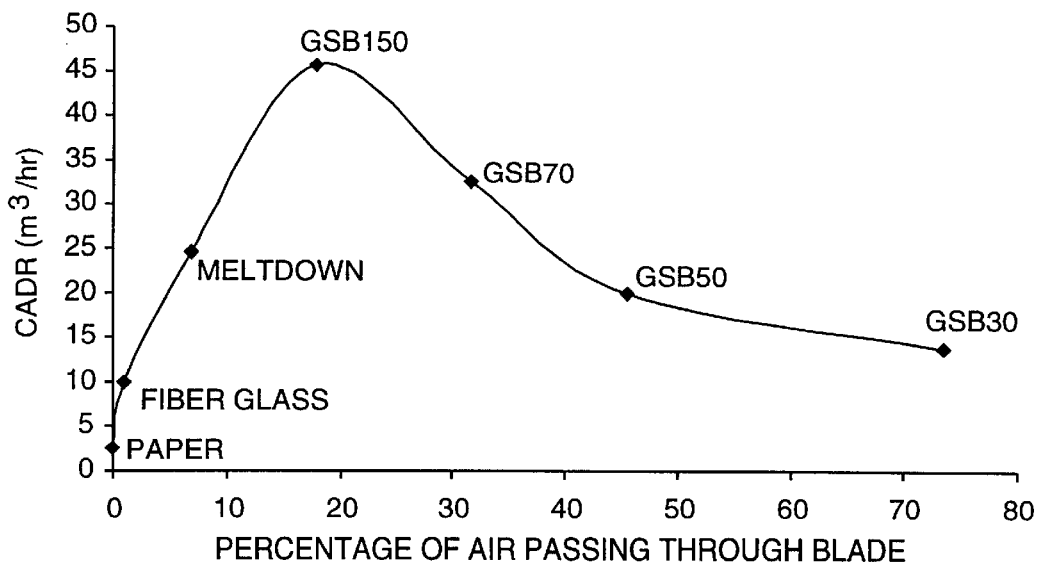
FIG. 8 is a graph of clean air delivery rate (CADR) versus percentage of air passing through a filter blade verses filter blade velocity as described in Example 6.

The data in TABLES 8 and 9 and FIGS. 7 and 8 provide a good picture of the inter-relationship of filtration performance and air passing through the filter media as influenced by the velocity or speed at which the filter media is moving. This data suggests that filter performance can be optimized for a given application by selection of filtration media and its associated permeability and the velocity at which the filtration media is moved in the particulate containing atmosphere.

Example 7–9

The particle loading performance and subsequent impact on the air delivery of moving filters according to the present invention was examined in the following examples.

An air inlet duct 15 cm in diameter by 46 cm long was vertically mounted above the Add-on Filter apparatus described above, with air entering the duct at the top and exiting at the bottom, into the center of the blower wheel. The inlet duct was positioned inside the hood of a TSI model 8370 "Accubalance" flow measuring hood (available from TSI Inc., St. Paul, Minn. 55164). The 60 cm by 60 cm bottom of the flow measuring hood was blanked off with a sheet of cardboard, with the 15 cm duct projecting through the cardboard blank. In this manner, any air entering the flow measuring hood exited through the 15 cm duct and moving filter unit.

The test dust used for this study was PTI fine (ISO 12103-1, A2), available from Powder Technology Incorporated, Burnsville Minn. 55337, which was dispersed with an ASHRAE 52.1 dust feeder, as described in ASHRAE publication #52.1-92, pages 6–8. (Dust feeders are available from Air Filter Testing Laboratories, Inc., Crestwood, Ky.) The dust feed rate was chosen to produce a dust concentration at the moving filter air inlet of about 75 milligrams per cubic meter. Dispersed dust from the dust feeder was conveyed by compressed air through a 2 cm ID "Tygon" tube to the throat of the 15 cm duct. Filters were challenged with 15–20 grams of fine test dust, which represents a significantly greater dust challenge than an average automobile HVAC system will encounter over the course of one year of normal operation.

The fan was operated at 13 volts to rotate the wheel at about 2400 rpm or at 6.5 volts to rotate the wheel at about 1350 rpm (as indicated in the following tables).

Cartridge filter units were assembled using "FITRETE" GSB70 media as described above to produce a filter cartridge having an inside diameter of 15.2 cm, an outside diameter of 19.4 cm, and a height of 4.2 cm with 81 pleats at a 6 mm spacing. The outer diameter tips of the pleated filter constructions used in Examples 7 and 8 were slit, while they were left intact (not slit) in the filter used in Example 9.

Example 7

A slit tip pleated filter constructed as described above was weighed, the blower wheel and the filter unit (with the clean filter) operated at 13 volts (8 amps) which produced an airflow rate of 4.09 cubic meters per minute (146 cubic feet per minute).

PTI fine test dust was fed to the blower in increments of 2 grams, after which the voltage and amp draw were recorded and the filter removed from the blower wheel and weighed. After weighing, the filter was reinstalled on the blower wheel, the filter unit returned to operation at the original voltage, and the unit exposed to the next increment of test dust. In this way the gravimetric particle collection was measured for comparison against blower performance, the results of which are reported in TABLE 10.

TABLE 10

Particle Loading Airflow Correlations

| Cumulative Dust Fed (gms) | Filter Weight Gain (gms) | Particle Removal Efficiency (%) | Airflow Rate (m³/min) | Volts | Amps |
|---|---|---|---|---|---|
| 0 | — | — | 4.09 | 13 | 8.0 |
| 2 | 0.77 | 38.5 | 3.92 | 13 | 8.0 |
| 4 | 0.71 | 35.5 | 3.86 | 13 | 7.8 |
| 6 | 0.70 | 35.0 | 3.86 | 13 | 7.7 |
| 8 | 0.75 | 37.5 | 3.92 | 13 | 7.8 |
| 10 | 0.65 | 32.5 | 3.89 | 13 | 7.6 |
| 12 | 0.75 | 37.5 | 3.92 | 13 | 7.6 |
| 14 | 0.63 | 31.5 | 3.92 | 13 | 7.6 |
| 16 | 0.55 | 27.5 | 3.89 | 13 | 7.6 |
| 18 | 0.67 | 33.5 | 3.89 | 13 | 7.6 |
| 20 | /0.55 | 27.5 | 3.89 | 13 | 7.7 |

Examination of the data in TABLE 10 shows that the filter unit exhibited an average particle removal efficiency of 33.7% (corresponding to 6.73 gms dust collected) with a minimal reduction (4.9%) in airflow rate through the unit.

Example 8

A filter loading/performance study was conducted as described in Example 7 except that the filter unit (with the clean filter) was operated at 6.5 volts (2.7 amps) which produced an airflow rate of 2.1 cubic meters per minute (74 cubic feet per minute). The gravimetric loading/filter performance data are reported in TABLE 11.

TABLE 11

Particle Loading Airflow Correlations

| Cumulative Dust Fed (gms) | Filter Weight Gain (gms) | Particle Removal Efficiency (%) | Airflow Rate (m³/min) | Volts | Amps |
|---|---|---|---|---|---|
| 0 | — | — | 2.1 | 6.5 | 2.7 |
| 2 | 0.97 | 48.5 | 2.0 | 6.5 | 2.6 |
| 4 | 1.12 | 56.0 | 2.0 | 6.5 | 2.6 |
| 6 | 0.96 | 48.0 | 2.0 | 6.5 | 2.6 |
| 8 | 0.83 | 41.5 | 2.0 | 6.5 | 2.6 |
| 10 | 0.74 | 37.0 | 2.0 | 6.5 | 2.6 |
| 12 | 0.77 | 38.5 | 2.0 | 6.5 | 2.6 |
| 14 | 1.03 | 51.5 | 2.0 | 6.5 | 2.5 |
| 16 | 0.57 | 28.5 | 1.9 | 6.5 | 2.5 |
| 18 | 0.94 | 47.0 | 1.9 | 6.5 | 2.5 |
| 20 | 0.66 | 33.0 | 1.9 | 6.5 | 2.5 |

Examination of the data in TABLE 11 shows that the filter unit exhibited an average particle removal efficiency of 42.95% (corresponding to 8.59 gms dust collected) with a nominal reduction (9.5%) in airflow rate through the unit.

Example 9

A filter loading/performance study was conducted as described in Example 7 except that the tips of the pleated filter were not slit. The filter unit (with the clean filter) was operated at 13 volts (7.5 amps) and produced an airflow rate of 3.98 cubic meters per minute (142 cubic feet per minute). PTI fine test dust was fed to the blower in increments of 1 gram until a total of 5 grams had been fed, after which the dust was fed in 2 gram increments. The gravimetric loading/filter performance data are reported in TABLE 12.

TABLE 12

Particle Loading Airflow Correlations

| Cumulative Dust Fed (gms) | Filter Weight Gain (gms) | Particle Removal Efficiency (%) | Airflow Rate (m³/min) | Volts | Amps |
|---|---|---|---|---|---|
| 0 | — | — | 3.98 | 13 | 7.5 |
| 1 | 0.81 | 81.0 | 3.86 | 13 | 7.5 |
| 2 | 0.67 | 67.0 | 3.78 | 13 | 7.5 |
| 3 | 0.65 | 65.0 | 3.70 | 13 | 7.6 |
| 4 | 0.59 | 59.0 | 3.70 | 13 | 7.5 |
| 5 | 0.78 | 78.0 | 3.70 | 13 | 7.5 |
| 7 | 1.25 | 62.5 | 3.67 | 13 | 7.5 |
| 9 | 1.29 | 64.5 | 3.53 | 13 | 7.6 |
| 11 | 1.31 | 65.5 | 3.53 | 13 | 7.5 |
| 13 | 1.17 | 58.5 | 3.36 | 13 | 7.6 |
| 15 | 1.22 | 61.0 | 3.25 | 13 | 7.6 |

Examination of the data in TABLE 12 shows that while the filter cartridge having intact tips (i.e. unslit) exhibited a particle capture efficiency of 64.9% (corresponding to 9.74 gms dust collected), the higher efficiency was realized at the expense of a significant reduction (18%) in airflow rate through the unit.

The data in TABLES 10 and 11 also demonstrate that the gravimetric efficiency of moving filters is higher at lower rotational speeds than at higher rotational speeds, and that over the course of exposure to 20 gms of test dirt, filters having slit pleats are non-plugging while offering useful particle removal performance.

Example 10

The filtration performance of several filter media as a function of the permeability of the media was studied using the Automotive HVAC Configuration –second configuration (described above) in the Time to Cleanup (Particulate Challenge) test (also described above). The blower wheel of the automobile HVAC unit was fitted with a pleated filter cartridge having an OD of 12.38 cm, an ID of 10.48 cm, and a height of 5.4 cm, prepared as described above, with 56 pleats at a pleat spacing of 6 mm, each pleat being 10 mm in height and made from the indicated filter media (described above). All of the pleated cartridges used in this example had intact pleat tips (i.e. the pleat tips were not slit). The blower unit was placed in the test apparatus, a known particulate challenge introduced into the box, and the unit operated at 2600 rpm (9 volts). Particle count data for these studies are reported in TABLE 13.

TABLE 13

Pleat Tips Intact
Particle count vs. Time
(Particle Count × 10⁵)

| Time (min) | Baseline | GSB30 | GSB50 | GSB70 | Melt Blown | Fiber Glass | Paper |
|---|---|---|---|---|---|---|---|
| 0 | 3.08 | 3.11 | 3.11 | 3.10 | 3.08 | 3.11 | 3.09 |
| 0.5 | 3.05 | 2.78 | 2.55 | 2.22 | 2.73 | 2.92 | 3.00 |
| 1.0 | 3.02 | 2.18 | 1.62 | 1.03 | 2.22 | 2.64 | 2.91 |
| 1.5 | 2.98 | 1.55 | 0.868 | 0.389 | 1.64 | 2.30 | 2.83 |
| 2.0 | 2.95 | 1.03 | 0.436 | 0.150 | 1.13 | 1.94 | 2.73 |
| 2.5 | 2.91 | 0.665 | 0.214 | 0.064 | 0.758 | 1.60 | 2.63 |
| 3.0 | 2.89 | 0.421 | 0.114 | 0.035 | 0.483 | 1.29 | 2.53 |
| 3.5 | 2.85 | 0.275 | 0.067 | 0.026 | 0.314 | 1.02 | 2.44 |
| 4.0 | 2.82 | 0.187 | 0.043 | 0.023 | 0.204 | 0.802 | 2.34 |
| 4.5 | 2.78 | 0.130 | 0.034 | 0.022 | 0.136 | 0.623 | 2.23 |
| 5.0 | 2.75 | 0.097 | 0.029 | 0.021 | 0.093 | 0.490 | 2.13 |
| 5.5 | 2.71 | 0.078 | 0.027 | 0.021 | 0.067 | 0.388 | 2.02 |
| 6.0 | 2.68 | 0.062 | 0.026 | 0.021 | 0.053 | 0.303 | 1.92 |
| 6.5 | 2.65 | 0.055 | 0.027 | 0.021 | 0.044 | 0.245 | 1.82 |
| 7.0 | 2.62 | 0.049 | 0.026 | 0.022 | 0.040 | 0.200 | 1.72 |
| 7.5 | 2.58 | 0.047 | 0.026 | 0.022 | 0.036 | 0.163 | 1.63 |
| 8.0 | 2.55 | 0.044 | 0.025 | 0.023 | 0.034 | 0.142 | 1.53 |
| 8.5 | 2.51 | 0.042 | 0.026 | 0.022 | 0.032 | 0.121 | 1.46 |
| 9.0 | 2.48 | 0.040 | 0.027 | 0.023 | 0.031 | 0.106 | 1.36 |
| 9.5 | 2.45 | 0.043 | 0.026 | 0.022 | 0.031 | 0.094 | 1.27 |
| 10.0 | 2.40 | 0.042 | 0.026 | 0.022 | 0.030 | 0.086 | 1.21 |

Examination of the data in TABLE 13 shows that when operating at comparable conditions in a "moving filter" configuration, more porous filtration materials (i.e. GSB30, GSB50, GSB70, and meltblown) are more effective in removing particles than less permeable materials (i.e. fiber glass, and paper).

Figure 9:
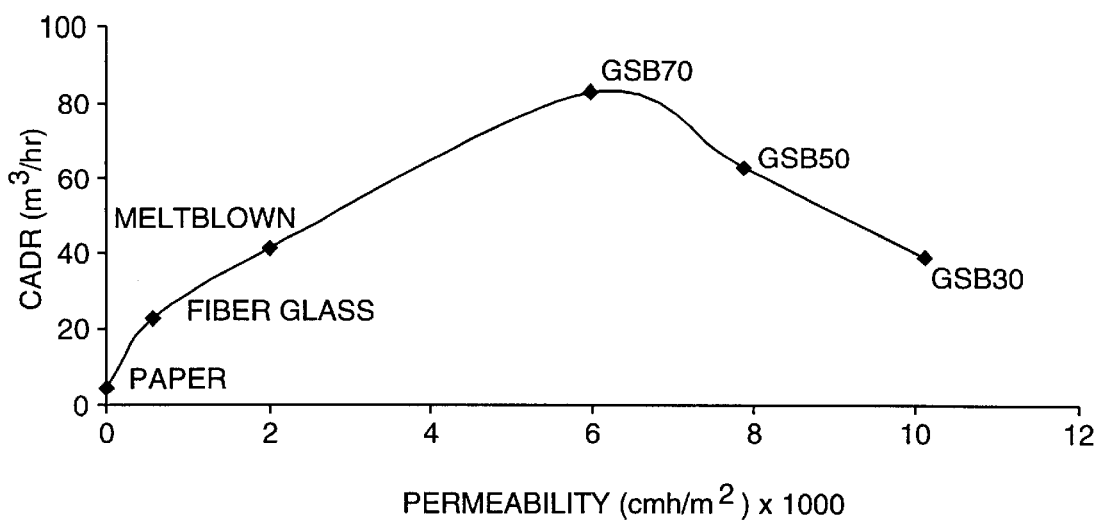
FIG. 9 is a graph of clean air delivery rate (CADR) versus filter media permeability as described in Example 10.

The Clean Air Delivery Rate (CADR) calculated on the data shown in TABLE 13 for the various filtration media are shown in TABLE 14 and graphically presented in FIG. 9, where the CADR is compared to the permeability of the filtration media.

TABLE 14

Pleat Tips Intact
CADR vs. Media Permeability

| Filtration Material | Frazier Permeability[1] | | CADR[2] | |
|---|---|---|---|---|
| | m³/h/m² | ft.³/h/ft² | m³/h | ft.³/min |
| GSB30 | 10,122 | 553.5 | 39.2 | 23.1 |
| GSB50 | 7,888 | 431.3 | 62.9 | 37.0 |
| GSB70 | 5,969 | 326.4 | 83.1 | 48.9 |
| Meltblown | 2,011 | 110 | 41.5 | 24.4 |
| Fiber Glass | 554 | 30.3 | 22.9 | 13.5 |
| Paper | 6.4 | 0.35 | 4.2 | 2.5 |

[1]Determined as described in the Frazier Permeability test procedure above.
[2]Calculated as described in the "Method for Measuring Performance of Portable Household Electric Cord-Connected Room Air Cleaners," ANSI/AHAM AC-1-1988.

The inter-relationship of media permeability (Frazier Permeability) and CADR in a pleated filter cartridge configuration operating in the automotive HVAC unit is readily apparent from an examination of the data in TABLE 14 or FIG. 9 and paralleled the inter-relationship demonstrated with the mini-turbo fan configuration.

Example 11

Example 10 was repeated using a pleated filter cartridge having slit tips to increase the permeability of the filter media. Particle count data for these studies are reported in TABLE 15.

TABLE 15

Slit Pleat Tips
Particle count vs. Time
(Particle Count x $10^5$)

| Time (min) | Baseline | GSB30 | GSB50 | GSB70 | Melt blown | Fiber Glass | Paper |
|---|---|---|---|---|---|---|---|
| 0 | 3.08 | 3.11 | 3.08 | 3.08 | 3.09 | 3.07 | 3.07 |
| 0.5 | 3.05 | 2.83 | 2.62 | 2.52 | 2.83 | 2.87 | 2.98 |
| 1.0 | 3.02 | 2.35 | 1.89 | 1.57 | 2.34 | 2.26 | 2.87 |
| 1.5 | 2.98 | 1.83 | 1.20 | 0.817 | 1.79 | 2.26 | 2.76 |
| 2.0 | 2.95 | 1.36 | 0.733 | 0.398 | 1.28 | 1.90 | 2.64 |
| 2.5 | 2.91 | 0.960 | 0.444 | 0.194 | 0.866 | 1.55 | 2.50 |
| 3.0 | 2.89 | 0.676 | 0.282 | 0.111 | 0.571 | 1.25 | 2.36 |
| 3.5 | 2.85 | 0.472 | 0.191 | 0.070 | 0.371 | 0.976 | 2.23 |
| 4.0 | 2.82 | 0.340 | 0.135 | 0.049 | 0.244 | 0.769 | 2.10 |
| 4.5 | 2.78 | 0.252 | 0.096 | 0.040 | 0.160 | 0.594 | 1.96 |
| 5.0 | 2.75 | 0.189 | 0.075 | 0.037 | 0.107 | 0.467 | 1.81 |
| 5.5 | 2.71 | 0.153 | 0.061 | 0.033 | 0.073 | 0.367 | 1.69 |
| 6.0 | 2.68 | 0.126 | 0.055 | 0.034 | 0.052 | 0.300 | 1.56 |
| 6.5 | 2.65 | 0.104 | 0.047 | 0.039 | 0.039 | 0.248 | 1.43 |
| 7.0 | 2.62 | 0.091 | 0.047 | 0.037 | 0.031 | 0.208 | 1.32 |
| 7.5 | 2.58 | 0.077 | 0.041 | 0.033 | 0.026 | 0.181 | 1.21 |
| 8.0 | 2.55 | 0.075 | 0.039 | 0.030 | 0.023 | 0.160 | 1.10 |
| 8.5 | 2.51 | 0.067 | 0.036 | 0.030 | 0.021 | 0.136 | 1.01 |
| 9.0 | 2.48 | 0.058 | 0.036 | 0.027 | 0.021 | 0.120 | 0.921 |
| 9.5 | 2.45 | 0.058 | 0.036 | 0.026 | 0.023 | 0.110 | 0.841 |
| 10.0 | 2.40 | 0.058 | 0.034 | 0.030 | 0.021 | 0.099 | 0.764 |

Examination of the data in TABLE 15 shows that when operating at comparable conditions in a "moving filter" configuration, more porous (i.e. slit pleat tip filter configurations) are capable of reducing particulate challenges to levels approximating those produced by filter cartridges having intact pleat tips, but that the clean-up occurs at a slower rate.

Figure 10:
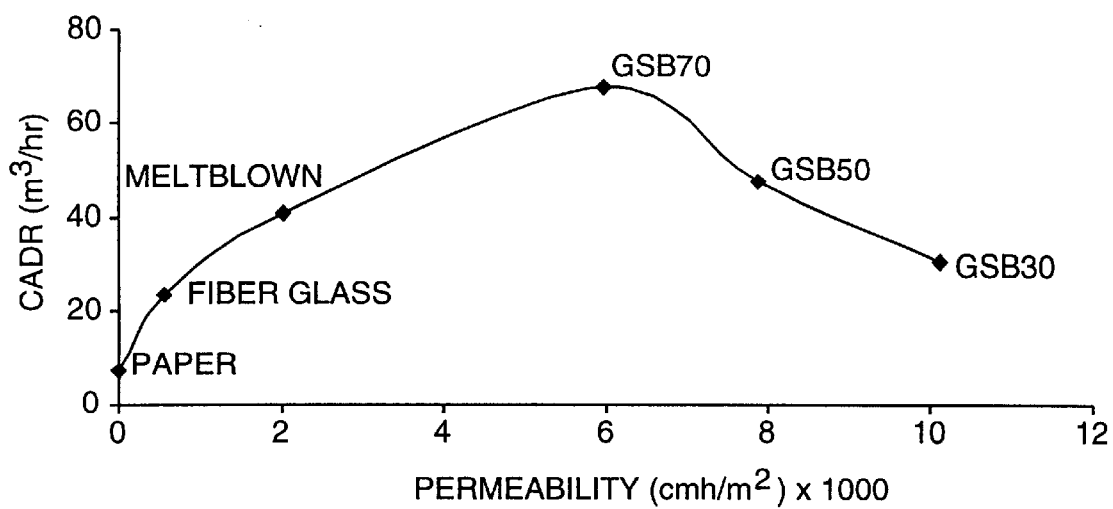
FIG. 10 is a graph of clean air delivery rate(CADR) versus filter media permeability as described in Example 11.

The Clean Air Delivery Rate (CADR) calculated on the data shown in TABLE 15 for the various filtration media are shown in TABLE 16 and graphically presented in FIG. 10, where the CADR is compared to the permeability of the filtration media.

TABLE 16

Slit Pleat Tips
CADR vs. Media Permeability

| Filtration Material | Fazier Permeability[1] | | CADR[2] | |
|---|---|---|---|---|
| | m³/h/m² | ft.³/h/ft² | m³/h | ft.³/min |
| GSB30 | 10,122 | 553.5 | 30.6 | 18.0 |
| GSB50 | 7,888 | 431.3 | 47.7 | 28.1 |
| GSB70 | 5,969 | 326.4 | 67.8 | 39.9 |
| Meltblown | 2,011 | 110 | 40.9 | 24.1 |
| Fiber Glass | 554 | 30.3 | 23.4 | 13.8 |
| Paper | 6.4 | 0.35 | 7.1 | 4.2 |

[1]Determined as described in the Frazier Permeability test procedure above.
[2]Calculated as described in the "Method for Measuring Performance of Portable Household Electric Cord-Connected Room Air Cleaners," ANSI/AHAM AC-1-1988.

The inter-relationship of media permeability (Frazier Permeability) and CADR in a pleated filter cartridge configuration operating in the automotive HVAC unit is readily apparent from an examination of the data in TABLE 16 or FIG. 5 and exhibited a pattern similar to the pleated filter cartridge having intact pleat tips. Increasing the overall permeability of the filter media by slitting the pleat tips reduces the CADR for filter cartridges based on more permeable filtration media (GSB30, GSB50, & GSB70) while it maintains or increases the CADR for filter cartridges based on less permeable filtration media (meltblown, fiber glass and paper).

Example 12

Filtration performance of GSB30, GSB50, GSB70, meltblown filtration media was compared in moving/charged, moving/uncharged, and static/uncharged configurations using the Time to Cleanup (Particulate Challenge) test and the automotive HVAC test configuration. The blower wheel of the HVAC unit was fitted with a clean pleated filter made of the indicated media, which was prepared as described above, for each test run. The filter cartridges had 50 pleats, a 6 mm pleat spacing, a pleat height of 10 mm, and 11.43 cm OD×9.53 cm ID×5.08 cm height with a poster board rings added to the top and bottom of the cartridge for added strength. Each filter cartridge was also fitted with a 3.81 cm diameter paper cone inside the filter loop to avoid air bypass in the blower wheel. Moving filters were attached directly to the blower wheel by means of poster board tabs and the static filters were mounted to a supporting ring made of poster board attached to the back side of the housing unit of the blower assembly, which provided a clearance of 0.635 cm between the filter and the blower wheel sides and 0.95 cm clearance between the filter and the base of the blower wheel. The static filters were also fitted with a paper cone to avoid air by pass in the blower wheel. All filter configurations were subject to the same particle challenge, the HVAC unit was operated at 9 volts (2800 rpm) and the particle count in the test apparatus was monitored at 30 second intervals for a period of 10 minutes. Particle count data for the GSB30 filters is reported in TABLE 17, particle count data for the GSB50 filters is reported in TABLE 18, particle count data for the GSB70 filters is reported in TABLE 19, and particle count data for the meltblown filters is reported in TABLE 20.

TABLE 17

Filtration Performance of GSB30 Media
(% Cleanup)

| Time (minutes) | GSB30 Charged/ Moving | GSB30 Uncharged/ Moving | GSB30 Uncharged/ Static |
|---|---|---|---|
| 0 | 0 | 0 | 0 |
| 0.5 | 12.8 | 7.15 | 5.4 |
| 1.0 | 35.1 | 19.95 | 14.6 |
| 1.5 | 56.6 | 34.3 | 24.9 |
| 2.0 | 73.6 | 48.6 | 35.8 |
| 2.5 | 84.6 | 61.2 | 46.4 |
| 3.0 | 91.1 | 71.5 | 55.8 |
| 3.5 | 94.7 | 79.4 | 64.8 |
| 4.0 | 96.9 | 85.1 | 72.0 |
| 4.5 | 98.0 | 89.4 | 77.9 |
| 5.0 | 98.7 | 92.3 | 82.5 |
| 5.5 | 99.0 | 94.3 | 86.2 |
| 6.0 | 99.2 | 95.9 | 89.0 |
| 6.5 | 99.4 | 96.9 | 91.1 |
| 7.0 | 99.5 | 97.5 | 92.7 |
| 7.5 | 99.5 | 98.0 | 93.8 |
| 8.0 | 99.6 | 98.4 | 94.6 |
| 8.5 | 99.5 | 98.6 | 95.5 |
| 9.0 | 99.5 | 98.8 | 96.1 |
| 9.5 | 99.6 | 98.9 | 96.7 |
| 10.0 | 99.6 | 99.1 | 97.0 |
| CADR (m³/h) | 53.3 | 33.0 | 22.9 |

TABLE 18

Filtration Performance of GSB50 Media (% Cleanup)

| Time (minutes) | GSB50 Charged/ Moving | GSB50 Uncharged/ Moving | GSB50 Uncharged/ Static |
|---|---|---|---|
| 0 | 0 | 0 | 0 |
| 0.5 | 19.5 | 6.4 | 4.9 |
| 1.0 | 51.8 | 18.6 | 13.8 |
| 1.5 | 76.5 | 32.2 | 24.4 |
| 2.0 | 88.7 | 46.5 | 35.8 |
| 2.5 | 94.7 | 58.7 | 46.7 |
| 3.0 | 97.2 | 69.5 | 56.9 |
| 3.5 | 98.4 | 77.5 | 66.0 |
| 4.0 | 98.0 | 83.7 | 73.2 |
| 4.5 | 99.2 | 88.1 | 79.2 |
| 5.0 | 99.3 | 91.3 | 83.8 |
| 5.5 | 99.3 | 93.7 | 87.5 |
| 6.0 | 99.3 | 95.3 | 90.3 |
| 6.5 | 99.4 | 96.5 | 92.5 |
| 7.0 | 99.4 | 97.2 | 94.1 |
| 7.5 | 99.4 | 97.6 | 95.4 |
| 8.0 | 99.4 | 98.0 | 96.5 |
| 8.5 | 99.4 | 98.3 | 97.2 |
| 9.0 | 99.4 | 98.5 | 978.7 |
| 9.5 | 99.4 | 98.7 | 98.1 |
| 10.0 | 99.4 | 98.7 | 98.4 |
| CADR (m³/h) | 70.8 | 31.5 | 26 |

TABLE 19

Filtration Performance of GSB70 Media (% Cleanup)

| Time (minutes) | GSB70 Charged/ Moving | GSB70 Uncharged/ Moving | GSB70 Uncharged/ Static |
|---|---|---|---|
| 0 | 0 | 0 | 0 |
| 0.5 | 23.2 | 5.3 | 3.9 |
| 1.0 | 60.2 | 12.0 | 8.7 |
| 1.5 | 83.8 | 19.8 | 14.4 |
| 2.0 | 93.7 | 28.2 | 20.0 |
| 2.5 | 97.4 | 36.9 | 25.9 |
| 3.0 | 98.9 | 45.1 | 32.2 |
| 3.5 | 99.4 | 52.6 | 38.2 |
| 4.0 | 99.6 | 60.2 | 44.7 |
| 4.5 | 99.7 | 66.5 | 50.2 |
| 5.0 | 99.8 | 71.4 | 55.4 |
| 5.5 | 99.7 | 76.0 | 60.4 |
| 6.0 | 99.8 | 80.1 | 65.0 |
| 6.5 | 99.8 | 83.2 | 68.9 |
| 7.0 | 99.8 | 86.2 | 72.8 |
| 7.5 | 99.8 | 88.5 | 76.0 |
| 8.0 | 99.8 | 90.5 | 79.1 |
| 8.5 | 99.8 | 91.9 | 81.4 |
| 9.0 | 99.8 | 93.1 | 84.0 |
| 9.5 | 99.7 | 94.2 | 86.1 |
| 10.0 | 99.7 | 95.0 | 87.6 |
| CADR (m³/h) | 87.7 | 17.9 | 11.7 |

TABLE 20

Filtration Performace of Meltblown Media (% Cleanup)

| Time (minutes) | Meltblown Charged/ Moving | Meltblown Uncharged/ Moving | Meltblown Uncharged/ Static |
|---|---|---|---|
| 0 | 0 | 0 | 0 |
| 0.5 | 16.6 | 6.5 | 6.2 |
| 1.0 | 42.4 | 15.4 | 14.2 |
| 1.5 | 65.5 | 26.3 | 24.0 |
| 2.0 | 81.1 | 37.4 | 34.2 |
| 2.5 | 90.2 | 48.5 | 44.6 |
| 3.0 | 94.5 | 58.9 | 53.8 |
| 3.5 | 97.0 | 67.7 | 62.8 |
| 4.0 | 98.1 | 75.2 | 70.0 |
| 4.5 | 98.8 | 81.1 | 76.0 |
| 5.0 | 99.2 | 85.5 | 81.1 |
| 5.5 | 99.3 | 89.0 | 85.2 |
| 6.0 | 99.5 | 91.6 | 88.2 |
| 6.5 | 99.5 | 93.6 | 90.6 |
| 7.0 | 99.5 | 95.0 | 92.3 |
| 7.5 | 99.5 | 96.0 | 93.8 |
| 8.0 | 99.6 | 96.9 | 94.9 |
| 8.5 | 99.6 | 97.5 | 95.8 |
| 9.0 | 99.6 | 98.0 | 96.4 |
| 9.5 | 99.6 | 98.4 | 96.9 |
| 10.0 | 99.5 | 98.6 | 97.3 |
| CADR (m³/h) | 62.3 | 27.0 | 22.7 |

Examination of the data in TABLES 17–20 clearly demonstrates that all four media studied can remove a particulate challenge more rapidly in a moving configuration than in a static configuration and that this performance advantage is realized whether the media is charged or uncharged. Optimum particle removal performance for all four media was realized when the media was charged.

We claim:

1. An air delivery device comprising a housing having an air inlet and an air outlet, between the air inlet and the air outlet is located an air delivery fan having at least two rotating air moving means, the rotating air moving means intersect the flow of air between the air inlet and the air outlet and establish a high pressure zone at the air outlet relative to the air inlet, the air delivery fan further comprising at least one porous filter element having at least one upstream filter face and at least one downstream filter face defining at least one primary flow channel, where the at least one upstream filter face rotates along the same axis of rotation as the air moving means and where the upstream filter face moves into a portion of the airflow through the air delivery fan such that the upstream filter face impacts a portion of the moving airflow in a flow channel, permitting the air to flow through the filter element from the upstream filter face to the downstream filter face and from the downstream filter face into a further portion of the airflow in a flow channel, the filter elements and/or air moving means further defining air flow passages allowing unrestricted airflow into and through primary flow channels to the air outlet, wherein the air filter elements comprise a filter of electret charged filter media having an average Frazier Permeability of at least 2000 m³/hr/m².

2. The air deliver device of claim 1 wherein the at least one filter element comprises a nonwoven fibrous filter web formed at least in part of electret charged fibers.

3. The air delivery device of claim 1 wherein the air delivery fan is a centrifugal fan having an axial air inlet with air delivered radially of the axis of rotation of the fan wherein the air moving means have an upstream face that is generally aligned with the axis of rotation and the air flow passages form at least in part the air inlets and outlets.

4. The air delivery device of claim 1 wherein the air moving means comprise air moving elements where the air moving elements are parallel with the filter elements and the axis of rotation.

5. The air delivery device of claim 1 wherein the air flow passages are formed by a filter element upstream face and an adjacent filter element downstream face.

6. The air delivery device of claim 5 wherein the air moving elements are radially inward of the filter elements.

7. The air delivery device of claim 5 wherein the air moving elements are radially outward of the filter elements.

8. The air delivery device of claim 1 wherein the air moving elements are radially aligned with the filter elements.

9. The air delivery device of claim 8 wherein the air moving elements comprise the filter elements.

10. The air delivery device of claim 8 wherein the air moving elements comprise at least two blade elements extending radially outward from the axis of rotation.

11. The air delivery device of claim 10 wherein the air moving elements comprise at least four fan blade elements extending radially outward from the axis of rotation.

12. The air delivery device of claim 10 wherein the blade elements have filter elements incorporated across at least a portion of its cross sectional area.

13. The air delivery device of claim 10 wherein the blade element comprises a filter element over at least 50 percent of its cross sectional area.

14. The air delivery device of claim 10 wherein the blade element comprises a filter element over at least 75 percent of its cross sectional area.

15. The air delivery device of claim 10 wherein the blade elements intersect the axis of rotation of the fan.

16. The air delivery device of claim 1 wherein the air moving elements comprise at least two blade elements which blade elements are radially spaced from the axis of rotation forming an annular fan.

17. The air delivery device of claim 10 wherein the blade elements have a substantially smooth surface across the cross sectional area of the upstream face.

18. The air delivery device of claim 10 wherein the blade elements have a structured surface across the cross sectional area of the upstream face.

19. The air delivery device of claim 10 wherein the blade elements extend linearly in the radial direction.

20. The air delivery device of claim 19 wherein the blade elements extend nonlinearly or curved in the radial direction.

21. The air delivery device of claim 1 wherein there are two or more filter elements which are radially displaced from the air moving means and removably attached thereto.

22. The air delivery device of claim 21 wherein the filter elements form an annular filter.

23. The air delivery device of claim 5 wherein secondary flow channels are provided with flow passages allowing unrestricted airflow to the air outlet.

24. The air delivery device of claim 23 wherein the secondary flow channels are formed by pleating of the filter media.

25. The air delivery device of claim 23 wherein the secondary flow channels are in fluid communication with at least one primary flow channel.

26. The air delivery device of claim 25 wherein the secondary flow channels and primary flow channels in fluid communication are separated by filter media.

27. The air delivery device of claim 2 wherein the filter media has an average Frazier Permeability of from 2000 to 8000 $m^3/hr/m^2$.

28. The air delivery device of claim 2 wherein the filter media has an average Frazier Permeability of from 3000 to 6000 $m^3/hr/m^2$.

29. The air delivery device of claim 1 wherein the filter media has an average Frazier Permeability of from 2000 to 8000 $m^3/hr/m^2$.

30. The air delivery device of claim 27 wherein the filter media comprises a nonwoven fibrous web of melt blown microfibers.

31. The air delivery device of claim 27 wherein the filter media comprises a nonwoven fibrous filter web of split fibrillated charged fibers.

32. The air delivery device of claim 31 wherein the fibrous filter web is joined to a supporting scrim.

33. The air delivery device of claim 30 wherein the filter web further includes sorbent particulates or fibers.

34. The air delivery device of claim 27 wherein the filter element further includes additional functional layers.

35. The air delivery device of claim 34 wherein the additional functional layers are particle filtration layers.

36. The air delivery device of claim 34 wherein the additional functional layers are sorptive filtration layers.

37. A method of filtering particles from a moving airstream comprising;
 a. providing an air delivery device comprising a housing having an air inlet and an air outlet, between the air inlet and the air outlet is located an air delivery fan having at least two rotating air moving means, the rotating air moving means positioned to intersect the flow of air between the air inlet and the air outlet and establishing a high pressure zone at the air outlet relative to the air inlet, the air delivery fan further comprising at least one filter element having at least one upstream filter face and at least one downstream filter face defining at least one primary flow channel wherein the air filter elements comprise a filter of electret charged filter media having an average Frazier Permeability of at least 2000 $m^3/hr/m^2$;
 b. rotating the air moving means to establish a moving airflow;
 c. rotating the at least one upstream filter face along the same axis of rotation as the air moving means such that the upstream filter face moves into a portion of the moving airflow through the air delivery fan;
 d. impacting a portion of the moving airflow in a flow channel with the upstream filter face; and
 e. permitting air to flow through the filter element from the upstream filter face to the downstream filter face and from the downstream filter face into a further portion of the airflow in a flow channel.

38. The method of claim 37 wherein the filter element upstream and downstream filter faces define at least one air flow passage allowing substantially unimpeaded air flow of at least a portion of the moving airflow through the filter.

39. The method of claim 37 wherein the at least one filter element comprises a nonwoven fibrous filter web formed at least in part of electret charged fibers.

40. The method of claim 37 wherein the air enters the air delivery device by an axial air inlet and the rotating air moving means discharges the airflow radially of the axis of rotation of the fan wherein the air moving means have an upstream face that is generally aligned with the axis of rotation.

41. The method of claim 37 wherein the high pressure zone is at least 5 mm water higher than the inlet air pressure.

42. The method of claim 41 wherein the air moving elements are radially aligned with the filter elements.

43. The air method of claim 41 wherein the air moving elements are radially inward of the filter elements.

44. The method of claim 41 wherein the air moving elements are radially outward of the filter elements.

45. The method of claim 37 wherein the air moving elements comprise the filter elements.

46. The method of claim 37 wherein the air moving elements comprise at least two blade elements extending radially outward from the axis of rotation.

47. The method of claim 46 wherein the air moving elements comprise at least four fan blade elements extending radially outward from the axis of rotation.

48. The method claim 47 wherein the blade elements have filter elements incorporated across at least a portion of its cross sectional area.

49. The method of claim 48 wherein the blade element comprises a filter element over at least 50 percent of its cross sectional area.

50. The method of claim 49 wherein the blade element comprises a filter element over at least 75 percent of its cross sectional area.

51. The method of claim 50 wherein the blade elements intersect the axis of rotation of the fan.

52. The method of claim 41 wherein the high pressure zone is at least 10 mm water higher than the inlet pressure.

53. The method of claim 37 wherein the filter media has an average Frazier Permeability of from 2000 to 8000 $cm^3/hr/m^2$.

54. The method of claim 53 wherein the filter media has an average Frazier Permeability of from 3000 to 6000 $cm^3/hr/m^2$.

55. The method of claim 54 wherein the filter media has an average Frazier Permeability of from 2000 to 8000 $cm^3/hr/m^2$.

56. The method of claim 55 wherein the filter media comprises a nonwoven fibrous web of melt blown microfibers.

57. The method of claim 56 wherein the filter media comprises a nonwoven fibrous filter web of split fibrillated charged fibers.

58. The method of claim 57 wherein the fibrous filter web is joined to a supporting scrim.

59. The method of claim 58 wherein the filter web further includes sorbent particulates or fibers.

60. The method of claim 59 wherein the filter element further includes additional functional layers.

61. The method of claim 60 wherein the additional functional layers are particle filtration layers.

62. The method of claim 61 wherein the additional functional layers are sorptive filtration layers.

* * * * *

UNITED STATES PATENT AND TRADEMARK OFFICE
CERTIFICATE OF CORRECTION

PATENT NO.    : 6,277,176 B1
DATED         : August 21, 2001
INVENTOR(S)   : Tang, Yuan-Ming It is certified that error appears in the above-identified patent and that said Letters Patent is hereby corrected as shown below:

<u>Title page,</u>
Item [57], ABSTRACT,
Line 9, after "further comprises at", please delete "lest" and insert -- least --.

<u>Column 8,</u>
Line 41, please delete "second" and insert -- secondary --.

<u>Column 10,</u>
Line 18, please delete "permeability" and insert -- permeability --.

<u>Column 11,</u>
Line 26, please delete "$\leqq 0.3$" and insert -- $\leq 0.3$ --.

Line 66, please delete "AC-11-1988" and insert -- AC-1-1988 --.

<u>Column 15,</u>
Line 21, after "particulate" and before "challenge", please delete "L".

<u>Column 22,</u>
Line 29, Table 10 under the heading of "Filter Weight Gain (gms)", please delete "/0.55" and insert -- 0.55 --.

<u>Column 27,</u>
Line 15, Table 18 under the heading of "GBS50 Charged/Moving", please delete "98.0" and insert -- 98.9 --.

<u>Column 28,</u>
Line 57, please delete "deliver" and insert -- delivery --.

UNITED STATES PATENT AND TRADEMARK OFFICE
CERTIFICATE OF CORRECTION

PATENT NO. : 6,277,176 B1
DATED : August 21, 2001
INVENTOR(S) : Tang Yuan-Ming

It is certified that error appears in the above-identified patent and that said Letters Patent is hereby corrected as shown below:

Column 30,
Line 50, after "define at least", please delete "one air".
Line 51, please delete "substantially unimpeaded air" and insert -- unrestricted -- and delete "of" and insert -- by --.
Line 52, please delete "through the filter".

Column 31,
Line 24, please delete "media" and insert -- element --.

Column 32,
Line 1, please delete "media" and insert -- element --.
Line 4, please delete "media" and insert -- element --.

Signed and Sealed this

Twenty-second Day of October, 2002

*Attest:*

*Attesting Officer*

JAMES E. ROGAN
*Director of the United States Patent and Trademark Office*